United States Patent [19]
Carroll

[11] Patent Number: 5,655,022
[45] Date of Patent: Aug. 5, 1997

[54] APPARATUS AND METHOD FOR SYNCHRONIZING NONLINEAR SYSTEMS USING FILTERED SIGNALS

[75] Inventor: Thomas L. Carroll, Alexandria, Va.

[73] Assignee: The United States of America as represented by the Secretary of the Navy, Washington, D.C.

[21] Appl. No.: 536,027

[22] Filed: Sep. 29, 1995

[51] Int. Cl.⁶ .................................................. H04L 9/12
[52] U.S. Cl. ................... 380/48; 380/28; 380/46
[58] Field of Search ................... 380/28, 46, 48

[56] References Cited

U.S. PATENT DOCUMENTS

| | | | |
|---|---|---|---|
| 5,245,660 | 9/1993 | Pecora et al. | 380/48 |
| 5,291,555 | 3/1994 | Cuomo et al. | 380/48 X |
| 5,379,346 | 1/1995 | Pecora et al. | 380/48 |
| 5,402,334 | 3/1995 | Pecora et al. | 364/158 |

OTHER PUBLICATIONS

U.S. Patent Applic. S/N 08/267,696, filed Jun. 29, 1994 Inventors: Thomas L. Carroll et al. Entitled: "Synchronization of Nonautonomous Chadtic Systems". Now U.S. Pat No. 5,473,694.

*Primary Examiner*—Gilberto Barron, Jr.
*Attorney, Agent, or Firm*—Thomas E. McDonnell; George Jameson

[57] ABSTRACT

A filtered cascaded synchronized nonlinear system includes a nonlinear transmitter having stable first and second subsystems. The first subsystem produces a first transmitter signal for driving the second subsystem, and the second subsystem produces a second transmitter signal for driving the first subsystem. A first filter filters the second transmitter signal to produce a filter output signal. A subtractor subtracts the filter output signal from the second transmitter signal to produce a transmitter output signal which is transmitted to a nonlinear cascaded receiver. The receiver includes an adder for summing the received transmitter output signal with a receiver filter output signal to restore frequencies that were subtracted from the second transmitter signal in order to produce a first receiver drive signal. The receiver includes cascaded third and fourth subsystems that are respective duplicates of the first and second subsystems. The third subsystem is driven by the first receiver drive signal to produce a first receiver signal in synchronization with the first transmitter signal. The fourth subsystem is driven by the first receiver signal to produce a second receiver signal in synchronization with the second transmitter signal. A second filter filters the second receiver signal to produce the receiver filter output signal.

10 Claims, 21 Drawing Sheets

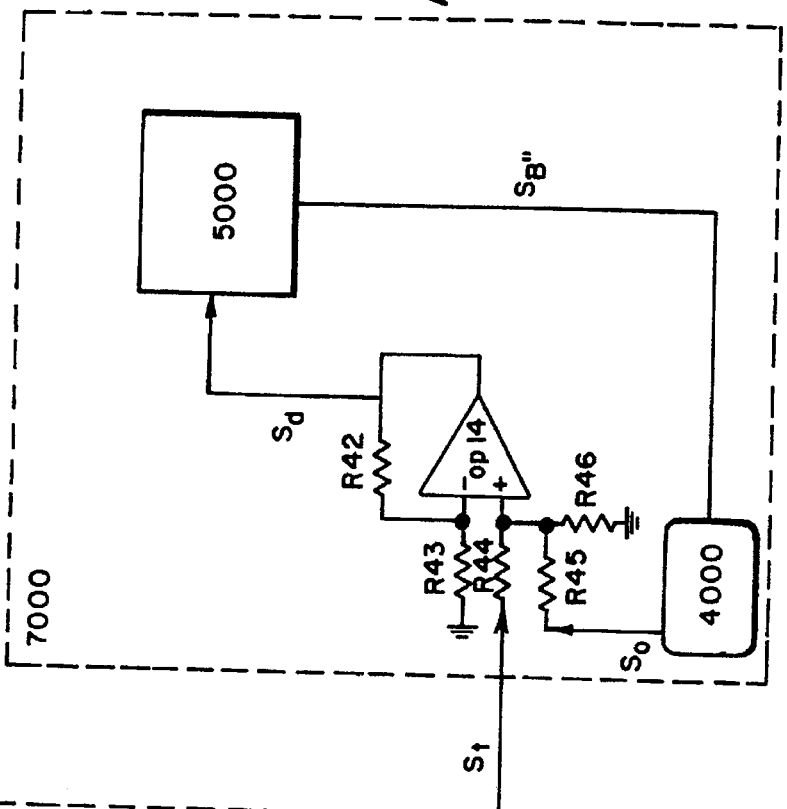
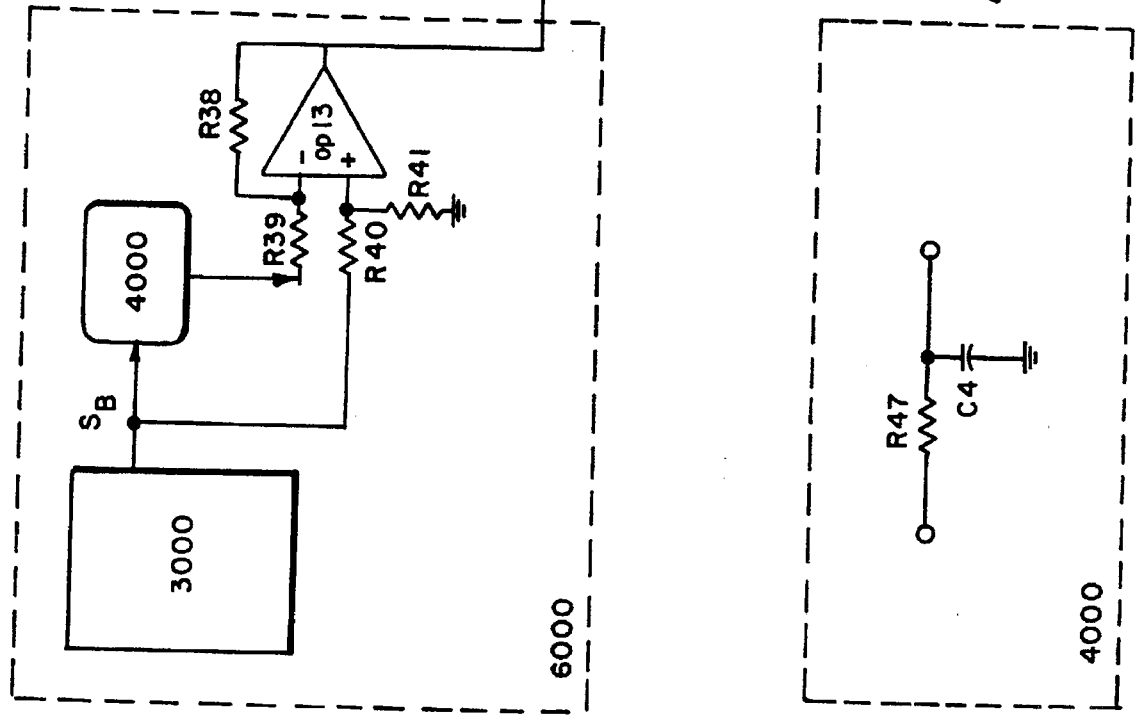
FIG. 15
FIG. 16

ALTERNATE CIRCUIT 4000

APPARATUS AND METHOD FOR SYNCHRONIZING NONLINEAR SYSTEMS USING FILTERED SIGNALS

CROSS REFERENCE TO RELATED PATENTS AND APPLICATIONS

This application is related to commonly assigned U.S. Pat. Nos. 5,245,660 (having Navy Case No. 72,593); 5,379,346 (having Navy Case No. 74,222); and 5,402,334 (having Navy Case No. 73,912). This application is also related to commonly assigned U.S. patent application Ser. No. 08/267,696 filed Jun. 29, 1994 (having Navy Case No. 75,496). U.S. Pat. Nos. 5,245,660 and 5,379,346 and U.S. patent application Ser. No. 08/267,696 are all incorporated herein by reference.

FIELD OF THE INVENTION

The present invention relates generally to physical systems with dynamical characteristics which involve synchronization of a transmitter system and a receiver system and, more particularly, to a system which allows the synchronization of a nonlinear system when the driving signal has been filtered.

DESCRIPTION OF THE RELATED ART

The design of most man-made mechanical and electrical systems assumes that the systems exhibit linear behavior (stationary) or simple nonlinear behavior (cyclic). In recent years there has been an increasing understanding of a more complex form of behavior, known as chaos, which is now recognized to be generic to most nonlinear systems. Systems evolving chaotically (chaotic systems) display a sensitivity to initial conditions, such that two substantially identical chaotic systems started with slightly different initial conditions (state variable values) will quickly evolve to values which are vastly different and become totally uncorrelated, even though the overall patterns of behavior will remain the same. This makes chaotic systems nonperiodic (there are no cycles of repetition whatsoever), unpredictable over long times, and thus such systems are impossible to synchronize by conventional methods. Y. S. Tang et al., "Synchronization and Chaos," *IEEE Transactions of Circuits and Systems*, Vol. CAS-30, No. 9, pp. 620–626 (September 1983) discusses the relationship between synchronization and chaotic systems in which selected parameters are outside some range required for synchronization.

SUMMARY OF THE INVENTION

It is therefore an object of the invention to provide systems for producing synchronized signals, and particularly nonlinear dynamical systems.

Another object of the invention is provide communication systems for encryption utilizing synchronized nonlinear sending and receiving circuits.

Another object of the invention is to provide improved control devices which rely on wide-frequency band synchronized signals.

Another object of the invention is to provide physical systems with dynamical characteristics which involve synchronization of a transmitter system and a receiver system and, more particularly, to a system which allows the synchronization of a nonlinear system when the driving signal has been filtered.

Another object of the invention is to provide synchronizable systems in which only a single drive signal is transmitted between systems, multiple synchronized signals can be produced and in which the drive signal can be reproduced to confirm synchronization.

Another object of the invention is to provide synchronizable systems in which the total dimension of the synchronized systems or the number of elements can be the same.

Another object of the invention is to provide synchronizable chaotic systems when the drive signal is filtered.

Another object of the invention is to transmit information using cascaded synchronizable chaotic systems with a filtered drive signal.

A further object of the invention is to transmit information using cascaded synchronizable chaotic systems using parameter changes to transmit information when the drive signal is filtered.

A cascaded synchronized nonlinear system includes a nonlinear drive system having stable first and second subparts. The first subpart produces a first drive signal for driving the second subpart and the second subpart produces a second drive signal for driving the first subpart. The nonlinear transmitter transmits the second drive signal to a nonlinear cascaded response system. The response system, being for producing an output signal in synchronization with the second drive signal, comprises a first stage (a duplicate of the first subpart) responsive to the second drive signal for producing a first response signal. The response system further comprises a second stage (a duplicate of the second subpart) responsive to the first response signal for producing the output signal.

A cascaded synchronized nonlinear system with a filtered drive signal includes a nonlinear drive system having stable first and second subparts. The first subpart produces a first drive signal for driving the second subpart and the second subpart produces a second drive signal for driving the first subpart. The second drive signal is passed through the transmitter filter and the transmitter filter output is subtracted from the second drive signal to produce the broadcast signal. The broadcast signal is transmitted to a nonlinear receiver with a cascaded section.

The receiver, being for producing an output signal in synchronization with the second drive signal, consists of a cascaded nonlinear response system and a filter section. The cascaded system comprises a first stage (a duplicate of the first subpart) responsive to the receiver driving signal produced by the filter section. The first stage produces a first response signal. The cascaded section further comprises a second stage (a duplicate of the second subpart) responsive to the first response signal for producing the output signal.

The filter section is comprised of a receiver filter identical to the transmitter filter and an adding circuit. The receiver filter is responsive to the receiver output signal, and produces the filter output signal. The adding circuit adds the filter output signal to the broadcast signal to produce the receiver driving signal.

The filtered cascaded synchronized nonlinear system can be used in an information transfer system. The transmitter responsive to an information signal produces a broadcast signal for transmission to the receiver. An error detector compares the receiver drive signal described above and the output signal produced by the receiver to produce an error signal indicative of the information contained in the information signal. These and other objects, features and advantages of the present invention are described in or apparent from the following detailed description of preferred embodiments.

BRIEF DESCRIPTION OF THE DRAWINGS

The preferred embodiments will be described with reference to the drawings, in which like elements have been denoted throughout by like reference numerals, and wherein:

FIG. 12–18 show details of the second embodiment of FIG. 11;

DETAILED DESCRIPTION OF THE PREFERRED EMBODIMENTS

All physical systems can be described by state variables. For example, a billiard game can be described by the position and the velocity of a ball at any instant of time; and an electronic circuit can be described by all of its currents and voltages at a particular time. This invention is a tangible system which can be of any form. The state variables and associated signals can be, as further examples, pressure or other force, temperature, concentration, population, or electro-magnetic field components. The evolution of a physical system depends on the dynamical relations between the state variables, which are usually expressed as functional relations between the rates of change of the variables. Thus, most but not all physical systems are describable in terms of ordinary differential equations (ODEs). Mathematical models of chaotic systems often involve two types of systems: flows and iterative maps. The former evolve as solutions of differential equations, and the latter evolve in discrete steps, such as by difference equations. For example, seasonal measurements of populations can be modeled as iterative maps. Cf., Eckmann et al., *Rev. Mod. Phys.*, Vol. 57, pp.617–618, 619 (1985). Some iterative maps could be considered as numerical solutions to differential equations. Solution or approximate solution of these equations, such as approximate, numerical, or analytical solution, provides information about the qualitative and quantitative behavior of the system defined by the equations.

As used herein, the synchronization of two or more evolving state variables of a physical system means the process by which the variables converge toward the same or linearly related but changing set of values. Thus, if one synchronized variable changes by a certain amount, the change of the other synchronized variable will also approach a linear function of the same amount. Graphically, the plot of the synchronized variables against each other as they evolve over time would approach a straight line.

Figure 1:
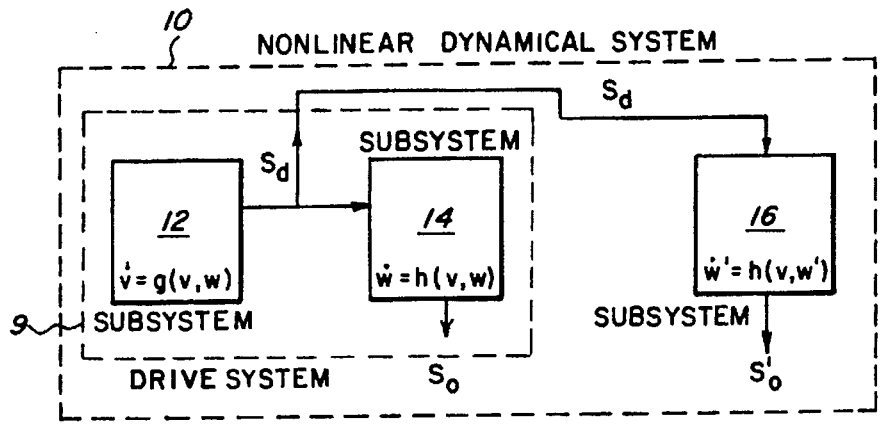
FIG. 1 is a general block diagram of a nonlinear dynamical physical system of the prior art.

Referring to FIG. 1, an n-dimensional autonomous nonlinear dynamical drive system 9 can be arbitrarily divided, as shown, into first and second parts or subsystems 12 and 14, each of which subsystems is also a nonlinear dynamical system. Drive system 9 and, more specifically, subsystem 14, has output signal $S_o$.

The following discussion involves mathematical modeling of the system 10 in terms of solutions to differential equations and provides theoretical support for the invention. However, it is not necessary in practicing this invention that system 10 be susceptible to such modeling. For example, as stated earlier, some iterated maps cannot be modeled as solutions to differential equations, and yet this invention encompasses Systems evolving according to iterated maps. As a further example, it is impractical to accurately model an ideal gas by individually considering the position and momentum of every molecule because of the vast number of molecules and variables involved.

This discussion about mathematical modeling is in two parts to correspond to two sources of difficulty in synchronizing signals: instability within a single system (chaos) and instability between two systems (structural instability). It is understood that both discussions apply to this invention and neither part should be read separately as limiting the practice of this invention.

A system with extreme sensitivity to initial conditions is considered chaotic. The same chaotic system started at infinitesimally different initial conditions may reach significantly different states after a period of time. As known to persons skilled in the art and discussed further, for example, in Wolf et al., *Determining Lyapunov Exponents from a Time Series*, Physica, Vol. 16D, p. 285 et seq. (1985), Lyapunov exponents (also known in the art as "characteristic exponents") measure this divergence. A system will have a complete set (or spectrum) of Lyapunov exponents, each of which is the average exponential rate of convergence (if negative) or divergence (if positive) of nearby orbits in phase space as expressed in terms of appropriate variables and components. If all the Lyapunov exponents are negative, then the same system started with slightly different initial conditions will converge (exponentially) over time to the same values, which values may vary over time. On the other hand, if at least one of the Lyapunov exponents is positive, then the same system started with slightly different initial conditions will not converge, and the system behaves chaotically. It is also known by persons skilled in the art that "in almost all real systems there exist ranges of parameters or initial conditions for which the system turns out to be a system with chaos . . . ." Chernikov et al., *Chaos: How Regular Can It Be?*, 27 Phys. Today 27, 29 (Nov. 1988).

Drive system 9 can be described by the ODE $$du(t)/dt = f\{u(t)\} \text{ or } \dot{u} = f(u) \qquad (1)$$

where $u(t)$ are the n-dimensional state variables.

Defined in terms of the state variables $v$ and $w$ for subsystems 12 and 14, respectively, where $u=(v,w)$, the ODEs for subsystems 12 and 14 are, respectively:

$$\dot{v} = g(v,w)$$

$$\dot{w} = h(v,w) \qquad (2)$$

where $v$ and $w$ are $m$ and $n-m$ dimensional, respectively, that is, where $v=(u_1, \ldots, u_m)$, $g=(f_1(u) \ldots, f_m(u))$, $w=(u_{m+1}, \ldots, u_n)$ and $h=(f_{m+1}(u), \ldots, f_n(u))$.

The division of drive system 9 into subsystems 12 and 14 is truly arbitrary since the reordering of the $u_i$ variables before assigning them to $v$, $w$, $g$ and $h$ is allowed.

If a new subsystem 16 identical to subsystem 14 is added to drive system 9, thereby forming system 10, then substituting the variables $v$ for the corresponding variables in the function $h$ augments equations (2) for the new three-subsystem system 10 as follows:

$$\dot{v} = g(v,w)$$

$$\dot{w} = h(v,w)$$

$$\dot{w}' = h(v,w'). \qquad (3)$$

Subsystem 16 has output signal $S_o'$.

The $w$ and $w'$ subsystems (subsystems 14 and 16) will only synchronize if $\Delta w \to 0$ as $T \to \infty$, where $\Delta w = w' - w$.

The rate of change of $\Delta w$ (for small $\Delta w$) is:

$$\Delta \dot{w} = d\Delta w/dt = h(v,w') - h(v,w) = D_w h(v,w)\Delta w + W; \qquad (4)$$

where $D_w h(v,w)$ is the Jacobian of the $w$ subsystem vector field with respect to $w$ only, that is: an $(n-m) \times (n-m)$ linear operator (matrix)

$$(D_w h)_{ij} = \partial h_i/\partial w_j \qquad (5)$$

for $(m+1) \le i \le n$ and $1 \le j \le (n-m)$, and where $W$ is a nonlinear operator. When Equation 4 is divided by $|\Delta w(0)|$, and $\xi = \Delta w(t)/\Delta w(0)$, an equation for the rate of change (the growth or shrinkage) of the unit displacement (n-m) dimensional vector, $\xi$, is obtained. In the infinitesimal limit, the nonlinear operator vanishes and this leads to the variational equation for the subsystem $$d\xi/dt = D_w h(v(t),w(t))\xi. \qquad (6)$$

The behavior of this equation or its matrix version, using the usual fundamental matrix approach, depends on the Lyapunov exponents of the w subsystem. These are hereinafter referred to as sub-Lyapunov exponents to distinguish them from the full Lyapunov spectrum of the $(v,w)=(u)$ system. Since the w subsystem 14 is driven by the v subsystem 12, the sub-Lyapunov exponents of the w subsystem 14 are dependent on the m dimensional v variable. If at least one of the sub-Lyapunov exponents is positive, the unit displacement vector $\xi$ will grow without bounds and synchronization will not take place. Accordingly, the subsystems 14 and 16 (w and w') will synchronize only if the sub-Lyapunov exponents are all negative. This principle provides a criterion in terms of computable quantities (the sub-Lyapunov exponents) that is used to design synchronizing systems in accordance with the present invention.

The $v=(v_1, \ldots, v_m)$ components (subsystem 12) can be viewed more broadly as driving variables and the $w'=(w'_{m+1}, \ldots, w'_n)$ components (subsystem 16) as responding variables. The drive system 9 (v,w) can be viewed as generating at least one drive signal $S_d$, in the formula v(t), which is applied to the response systems w and w' (subsystems 14 and 16, respectively) to synchronize the drive system and the response system outputs. This is the approach taken in accordance with the present invention to provide synchronized nonlinear dynamical systems.

In practicing this invention, the above discussion applies to identical subsystems 14 and 16. This might be achievable, for example, in digital systems. In such systems 10, the signals $S_o$ and $S_o'$ may each be chaotic because the system 9 might be chaotic. They may differ because of different initial conditions in subsystems 14 and 16. However, they will approach each other ($\Delta w \to 0$) because systems 14 and 16 are stable (that is, with all negative sub-Lyapunov exponents) when considered as driven by the same at least one drive signal $S_d$.

In most physical systems, subsystems 14 and 16 are not identical. For example, two electrical components with the same specifications typically do not have identical characteristics. The following explanation based on mathematical modeling shows that the signals $S_o$ and $S_o'$ will nevertheless be synchronized if both subsystems 14 and 16 have negative sub-Lyapunov exponents. According to this mathematical model, the synchronization is affected by differences in parameters between the w and w' systems which are found in real-life applications. Let $\mu$ be a vector of the parameters of the w subsystem (subsystem 14) and $\mu'$ of the w' subsystem (subsystem 16), so that $h=h(v,w,\mu)$, for example. If the w subsystem were one-dimensional, then for small $\Delta w$ and small $\Delta \mu = \mu' - \mu$:

$$\Delta \dot{w} = h_w \Delta w + h_\mu \Delta \mu \qquad (7)$$

where $h_w$ and $h_\mu$ are the partial derivatives of h with respect to $w$ and $\mu$, respectively. Roughly, if $h_w$ and $h_\mu$ are nearly constant in time, the solution of this equation will follow the formula $$\Delta w(t) = \left[ \Delta w(0) + \frac{h_\mu \cdot \Delta \mu}{h_w} \right] e^{h_w t} - \frac{h_\mu \cdot \Delta \mu}{h_w} \qquad (8)$$

If $h_w < 0$, the difference between w and w' will level off at some constant value and the systems will be synchronized. Although this is a simple one dimensional approximation, it turns out to be the case for all systems that have been investigated numerically, even when the differences in parameters are rather large (~10–20%). This is also the case in the exemplary electronic synchronizing circuit described in more detail hereinbelow. Furthermore, it can be established on a mathematical basis that the small changes in parameters only lead to proportionally small degradations of synchronization, which approach a constant value. See Pecora et al., "Driving systems with chaotic signals", Physical Review A, Vol. 44, No. 4, Aug. 15, 1991, pages 2374–2383.

Figure 2:
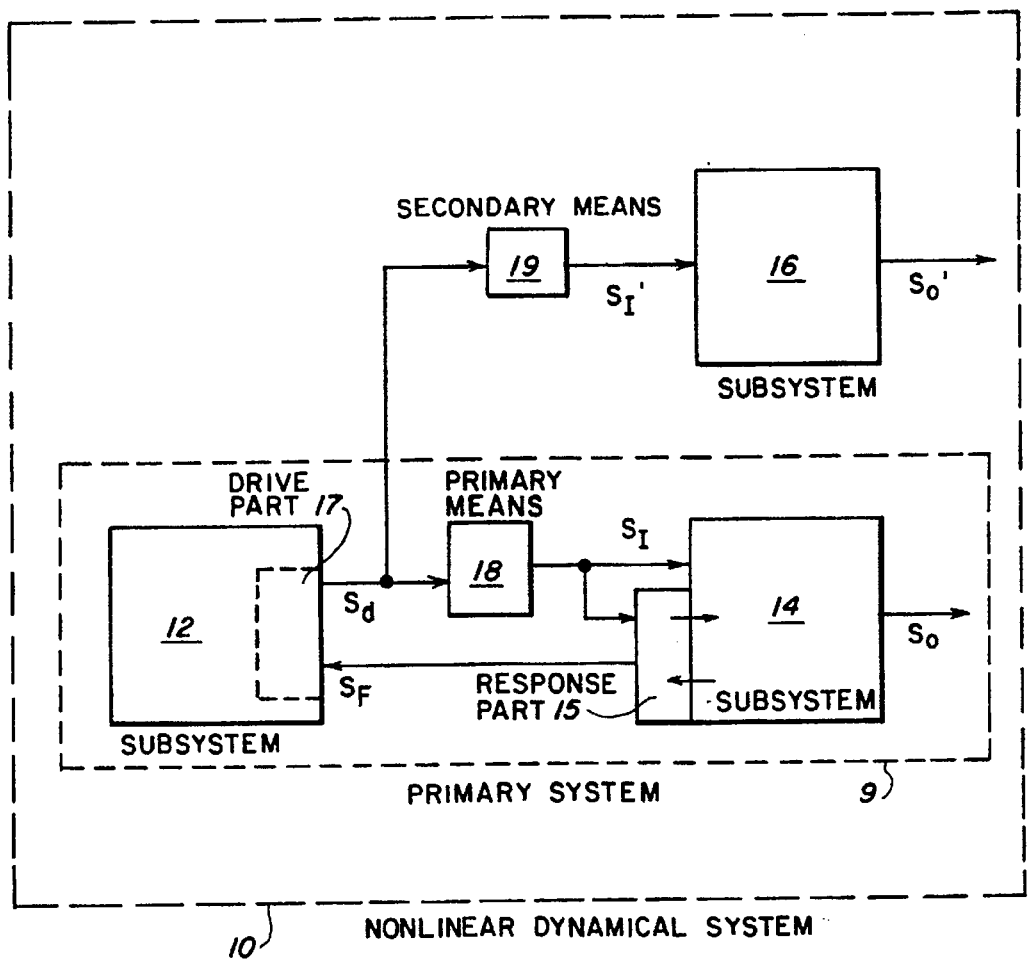
FIG. 2 is a general block diagram of an synchronized chaotic system of the prior art.

Since m-dimensional variable v may be dependent on (n-m)-dimensional variable w, there may be feedback from subsystem 14 to subsystem 12. As shown in FIG. 2, a response part 15 of subsystem 14 may produce a feedback signal $S_r$ responsive to the m-dimensional driving variable v, and a drive part 17 of subsystem 12 may respond to the feedback signal $S_F$ to produce the at least one drive signal $S_d$.

As shown in FIG. 2, subsystems 14 and 16 need not be driven by the same at least one drive signal $S_d$ but could be driven by at least one input signals $S_I$ and $S_I$ responsive to the at least one drive signal $S_d$. System 10 could have primary and secondary means 18 and 19, respectively, coupled to subsystem 12 and responsive to the at least one drive signal $S_d$ for generating input signals $S_I$ and $S_I'$, respectively. If these primary and secondary means 18 and 19, respectively are linearly responsive to the at least one drive signal $S_d$, then the above mathematical analysis would continue to apply since linear transformations do not affect the signs of the sub-Lyapunov exponents.

In accordance with the prior art, in order to develop electrical circuits, for example, which have chaotic dynamics, but which will synchronize, a nonlinear dynamical circuit (the drive subsystem) is duplicated (to form a response subsystem). A selected portion of the response circuit is removed, and all broken connections are connected to voltages produced at their counterparts in the drive circuit. These driving voltages constitute the at least one drive signal $S_d$ shown in FIG. 1, and advantageously are connected to the response circuit via a buffer amplifier to ensure that the drive circuit is not affected by the connection to the response circuit, i.e., it remains autonomous.

Figure 3:
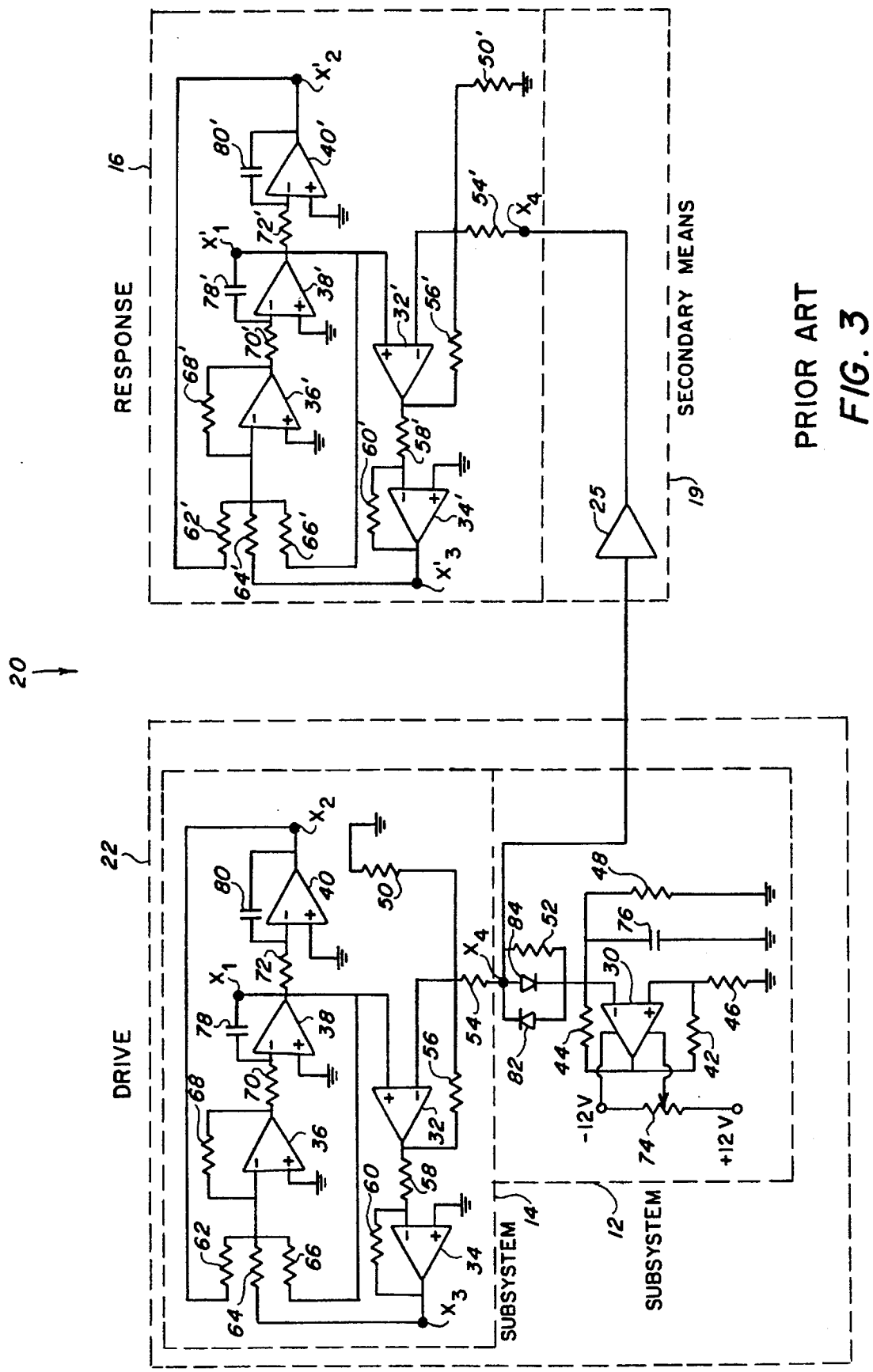
FIG. 3 is a schematic circuit diagram of a synchronized chaotic circuit system of the prior art.

As a specific example, FIG. 3 shows an electrical circuit system 20 constructed in accordance with the prior art which has two synchronized nonlinear dynamical subsystems, a drive circuit 22 and a response circuit 16. Circuits 22 and 16 correspond to the u and w' systems, respectively, discussed above.

Drive circuit 22 comprises a hysteretic circuit formed by a differential amplifier 30, resistors 42, 44, 46, 48, 50 and 52; potentiometer 74; capacitor 76; and diodes 82 and 84 connected as shown; and an unstable oscillator circuit formed by differential amplifiers 32, 34, 36, 38 and 40; resistors 58, 60, 62, 64, 66, 68, 70 and 72; and capacitors 78 and 80 connected as shown. In an experimental implementation of circuit system 20 which has been successfully tested, amplifiers 30–40 were MM741 operational amplifiers, and diodes 82 and 84 were 1N4739A diodes. Component values for the resistors and capacitors which were used are set forth in the following table:

| | |
|---|---|
| Resistor 42 = 10KΩ | Resistor 62 = 220KΩ |
| Resistor 44 = 10KΩ | Resistor 64 = 150KΩ |
| Resistor 46 = 10KΩ | Resistor 66 = 150KΩ |
| Resistor 48 = 20KΩ | Resistor 68 = 330KΩ |
| Resistor 50 = 100KΩ | Resistor 70 = 100KΩ |
| Resistor 52 = 50KΩ | Resistor 72 = 100KΩ |
| Resistor 54 = 3KΩ | Potentiometer 74 = 10KΩ |
| Resistor 56 = 20KΩ | Capacitor 76 = 0.01 μF |
| Resistor 58 = 100KΩ | Capacitor 78 = 0.01 μF |
| Resistor 60 = 100KΩ | Capacitor 80 = 0.001 μF |

Drive circuit 22 can be subdivided into two subparts 14 and 12. Although the illustrative subparts 14 and 12 shown in FIG. 3 correspond to the two circuits forming drive circuit 22, this is not necessary, and the division of a given drive circuit into subparts in order to determine the proper configuration for a synchronized response circuit is made in accordance with the analysis described herein. Subpart 14 corresponds to the w subsystem (subsystem 14 in FIG. 1), subpart 12 corresponds to the v subsystem described above. Those parts of subpart 14 which affect the signal at X4 and those parts of subpart 12 responsive thereto, respectively, constitute response part 15 (FIG. 2) and drive part 17 (FIG. 9.), to provide feedback. Response circuit 16 is substantially a duplicate of subpart 14 of drive circuit 22 (the specifications for primed components, such as resistor 50', are the same as the specification for unprimed components, such as resistor 50) and corresponds to subsystem w' (subsystem 16) described hereinabove. Signals $X_1$, $X_2$, $X_3$, and $X_4$ are characteristic voltages of drive circuit 22. The signal $X_4$ is connected as drive signal $S_d$ through a buffer amplifier 25, which ideally is an operational amplifier having linear characteristics such as an AD381 manufactured by Analog Devices, to response circuit 16 at the junction in circuit 16 corresponding to the junction in circuit 22 at which the signal $X_4$ is generated. Signal $X_4$ replaces the circuitry (subpart 12) of drive circuit 22 which is missing in response circuit 16. The subsystem of buffer amplifier 25 is the secondary means 19.

Drive circuit 22 is an autonomous system and behaves chaotically. It can be modeled by the following equations of motion for the three voltages $X_1$, $X_2$ and $X_3$ shown in FIG. 3.

$$\dot{X}_1 = X_2 + \gamma X_1 + cX_3$$

$$\dot{X}_2 = -\omega_2 X_1 - \delta_2 X_2$$

$$\epsilon \dot{X}_3 = (1-X_3)^2(sX_1 - r + X_3) - \delta_3 X_3, \quad (9)$$

where $\gamma=0.12$, $C=2.2$, $\omega_2=10.0$, $\delta_2=\delta_3=0.001$, $\epsilon=0.001$, $s=\frac{1}{6}$, and $r=0.0$.

An analysis of the sub-Lyapunov exponents for the response circuit 16 requires a transformation of the equations of motion from the ($X_1$, $X_2$, $X_3$) system to the ($X_1$, $X_2$, $X_4$) system. This is done by analyzing the circuit, and finding that $X_3 = \alpha X_4 - \beta X_1$ where $\alpha=6.6$ and $\beta=7.9$. This gives the following equations of motion:

$$\dot{X}_1 = X_2 + \gamma X_1 + c(\alpha X_4 - \beta X_1)$$

$$\dot{X}_2 = -\omega_2 X_1 - \delta_2 X_2$$

$$\epsilon \dot{X}_4 = (1/\alpha)\{(1-(\alpha X_4 - \beta X_1)^2)(sX_1 - r + \alpha X_4 - \beta X_1) - \delta_3 \alpha X_4 - \beta X_1 - \beta X_2 - \beta\gamma X_1 - \beta c(\alpha X_4 - \beta X_1)\} \quad (10)$$

The equations of motion for the response are just the $X_1$ and $X_2$ equations. The sub-Lyapunov exponents are calculated directly from the Jacobian of the $X_1$ and $X_2$ equations, which is a constant in this case. It will be appreciated that conventional methods for calculating Lyapunov exponents, as analytical, measurement, numerical and otherwise can be used, such as, for example, those described by Eckmann et al., Rev. Mod. Phys., Vol. 57, p.617 et seq. (1985); Lichtenberg et al., Regular and Stochastic Motion, Springer-Verlag, New York (1983); Rashband, Chaotic Dynamics of Nonlinear Systems, John Wiley and Sons, New York (1990); and Wolf et al., Physica, Vol. 16D, p. 285 et seq. (1985). The sub-Lyapunov exponents in this case are −16.587 and −0.603, implying that synchronization of the two electrical circuits 22 and 16 will occur. $X_4$ is the drive signal $S_d$ for the response subsystems and ($X_1$, $X_2$) and ($X_1'$, $X_2'$) are the synchronized signals $S_o$ and $S_o'$.

Circuit 22 itself runs in the realm of a few hundred Hz. Response circuit 16 synchronizes with drive circuit 22 within about two milliseconds. It has been observed experimentally that small changes (~10%) of the circuit parameters do not affect synchronization greatly, in that the response voltages still remain close to their counterparts in drive circuit 22; but larger changes (~50%) do. Even though the sub-Lyapunov exponents for the larger changes both remain negative, the response voltages no longer remain close to their drive counterparts.

The circuit of FIG. 3 has been used to transmit a pure frequency signal hidden in a chaotic signal as follows. With circuits 22 and 16 operating in a synchronized mode, a sine wave of a few hundred Hz was added to the $X_2$ signal from the drive circuit and sent to the response circuit. The $X'_2$ signal produced by response circuit 16 was then subtracted from the sum of the $X_2$ signal and the sine wave, thereby extracting the sine wave from the chaotic signal. Spectral analysis of the ($X_2$+sine wave) combination signal showed that the sine wave could not be detected in the chaos of the $X_2$ signal. The smallest sine wave that could be extracted this way was approximately 40 millivolts peak to peak compared to a two volt peak to peak $X_2$ signal, or a 50:1 ratio of chaotic signal to sine wave.

Many other possible choices for the drive circuit are possible and may require transformation of the circuit equations to model them. This can be determined as described hereinabove for nonlinear circuits by analyzing the circuit dynamics in terms of the sub-Lyapunov exponents to determine which signal(s) to choose as a drive signal or signals, and which subcircuit is to be used as a model for the response circuit.

It will also be appreciated that the prior art as described previously is applicable to any system which requires synchronization of remote signals and/or their low correlation with each other. For example, the prior art is particularly suited for use in control devices relying on wide-frequency-band synchronized signals.

Similar principles as discussed previously can be applied to cascaded subsystems which allow the multiple signals to be synchronized. In the following discussion the previously discussed design of synchronized subsystems is built on by cascading two or more subsystem responses.

The objective here is to get a synchronization of the response with its counterpart in the drive system but to build a response setup which produces signals in synchronization with one or more of the original input drive signals. The new synchronization signal may be used to process the original input drive, to detect parameter changes between the drive system and the responses, and to detect other information transmitted along with the output of the drive system.

Figure 4:
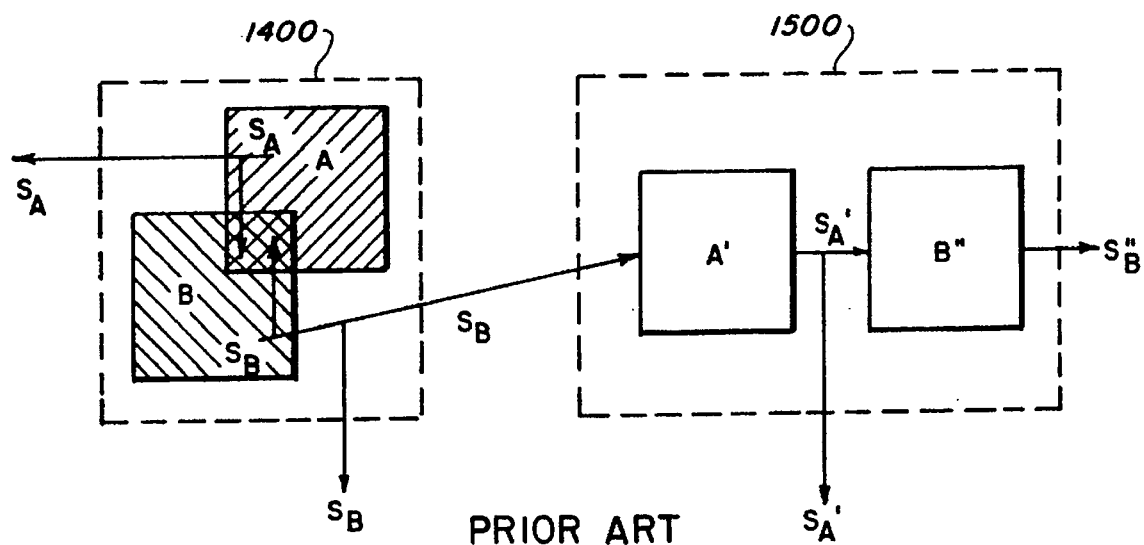
FIG. 4 illustrates a cascaded synchronized system of the prior art with two stages.

FIG. 4 illustrates a cascaded system having a drive system 1400 and a response system 1500. The drive system 1400 includes two subsystems A and B which are interdependent and may or may not overlap. Subsystem A drives subsystem B with signal $S_A$ and subsystem B drives subsystem A with signal $S_B$. The response system 1500 produces a signal $S_{B''}$ which is to be synchronized with a signal $S_B$ produced in the drive system 1400. The subsystem B of drive system 1400 transmits a drive signal $S_B$ to the response system 1500. The response system 1500 includes two subsystems A' and B" that are cascade connected. As in the single stage subsystems discussed earlier (see FIG. 1), subsystems A' and B" are duplicates of subsystems A and B, respectively, which have all-negative sub-Lyapunov exponents.

The subsystem A' receives the drive signal $S_B$ and provides a response signal $S_{A'}$ to the subsystem B". The subsystem B" in turn produces signal $S_{B''}$ in synchronization with signal $S_B$. Unlike the single stage synchronization systems discussed earlier (see FIG. 1), in the cascade system shown in FIG. 4, the same signal $S_B$ which the response system 1500 synchronizes with respect to is also used to drive the response system 1500. In the single stage synchronization system 10 of FIG. 1, the synchronized signal $S_o$ may be different than the drive signal $S_d$.

The response system 1500 with the cascaded subsystems A' and B" is not only capable of producing the signal $S_{B''}$ synchronized with the signal $S_B$ but is also capable of producing the signal $S_{A'}$ which is in synchronization with the signal $S_A$. Because the signal $S_{B''}$ can be compared to the signal $S_B$, the fact of synchronization can be clearly determined allowing those on the response system side to rely on the synchronization of the $S_B$ and $S_{B''}$ signals in concluding that signal $S_{A'}$ is in synchronization with signal $S_A$.

Because of the nature of nonlinear dynamical systems driven in the chaotic regime, properties of one chaotic system do not necessarily carry over to another chaotic system. Nevertheless, the prior art applies to any chaotic system in general, so long as the chaotic system includes at least two stable subsystems.

The two response signals or outputs $S_{A'}$ and $S_{B''}$ are produced as follows. The first subsystem A' accepts the input signal $S_B$ and produces its response signal $S_{A'}$ in synchronization with its counterpart ($S_A$) in the drive system 1400. The second subsystem B" is driven by signal $S_{A'}$ from the first subsystem A'. The second subsystem response $S_{B''}$ produces signal $S_{B''}$ in synchronization with its counterpart $S_B$ in the drive system 1400, which in this case is the original drive signal $S_B$ coming from the element B. The subsystems A' and B" are selected so that all of the essential elements of the drive system 1400 that are not present in the first subsystem A' are present in the second subsystem B" and vice-versa. In other words, the logical union of subsystems A' and B" includes all of the essential elements of the drive system 1400.

It is to be noted that each subsystem A' and B" in the response system 1500 is driven by a signal which supplies information in the drive system 1400 which is lacking in the drive subsystem. Thus, subsystem A' in the response system 1500 is driven by the same signal $S_B$ that drives subsystem A in the drive system 1400. Subsystem B" in the response system 1500 is driven by signal $S_{A'}$ produced by subsystem A', just as subsystem B in the drive system 1400 is driven by signal $S_A$ produced by subsystem A.

As discussed earlier, subsystems A, A', B and B" must have all-negative sub-Lyapunov exponents. In other words, subsystems A, A', B and B" are stable subsystems.

The same principles-discussed above concerning cascaded systems with 2 subsystems apply equally well to cascaded systems with more than 2 subsystems. In particular, each of the cascaded subsystems in the response system 1500 is a duplicate of a stable subsystem in the drive system 1400. Each subsystem in the response system 1500 is driven by a signal which supplies information from the complete system that is lacking in the drive subsystem, in particular, by a signal corresponding to the signal which drives the corresponding subsystem in the drive system 1400.

To understand the theory behind the cascaded system of FIG. 4 it is necessary to build on the previous discussion of equations 1-3. Once the first subsystem of the response system 1500 is created a second system is created, say modeled by the set of differential equations $\dot{r}=a(r,s)$ and $\dot{s}=b(r,s)$, where r and s are subsets of variables of u in the same way that v and w are subsets of variables of u. The r variables are the drives for the second subsystem just as the v variables were for the first subsystem. The functions a and b are the corresponding vector field components. If this second subsystem is a stable subsystem (See Pecora et al., Synchronization in Chaotic Systems, Physical Review Letters, Vol. 64, No. 8, February 1990 and Pecora et al., Driving Subsystems With Chaotic Signals, Physical Review A, Vol. 44, No. 4, August 1991, both incorporated by reference herein, for a discussion of how to determine whether stability exists), the s variables synchronize with their corresponding variables in the first system and with the drive signal. This then provides a signal in synchronization with the input drive (one or more of the variables).

For any two dynamical systems to become synchronized, they must start in the same basin of attraction. That is, their starting points (initial conditions) must be in the same set of points which will converge to the same attractor. Since many dynamical systems can have more than one attractor, it is possible for two such systems to start in different basins.

If the response system 1500 has somewhat different parameters than the drive system 1400, the synchronized signals will not be exactly equal and in general will have a difference which at small parameter changes will be proportional to the derivative of the vector fields with respect to the parameters. As discussed below, this effect along with others in the dynamical system allows communication using signals from nonlinear systems, including chaotic ones.

The details of cascaded synchronized systems and the circuit design, construction, and operation thereof will now be discussed.

Figure 5:
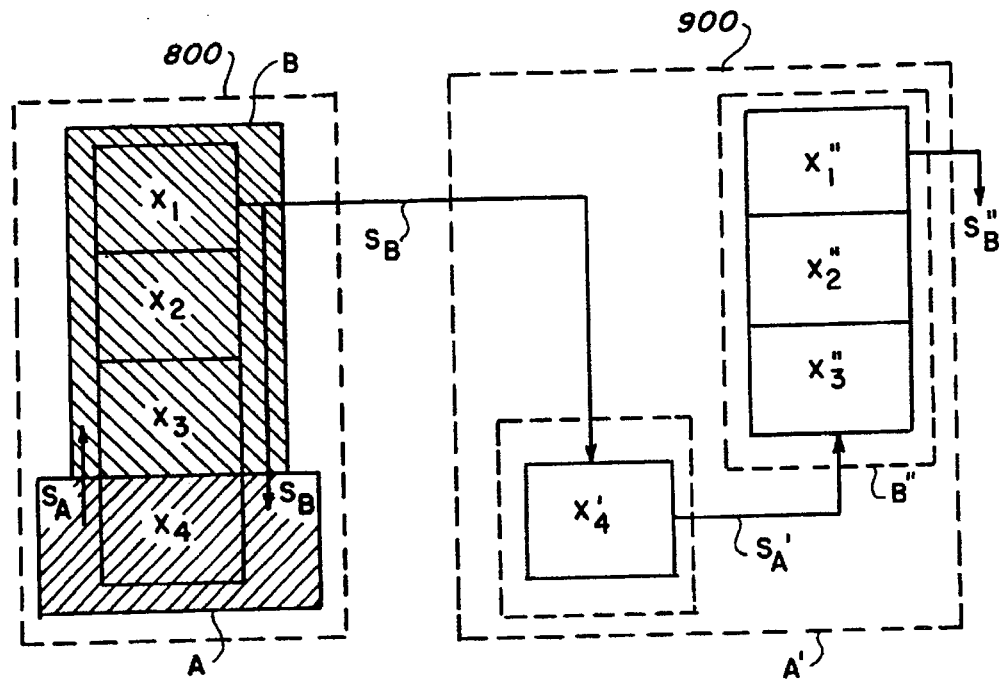
FIG. 5 shows an embodiment of a two stage cascaded synchronization system of the prior art.
Figure 6:
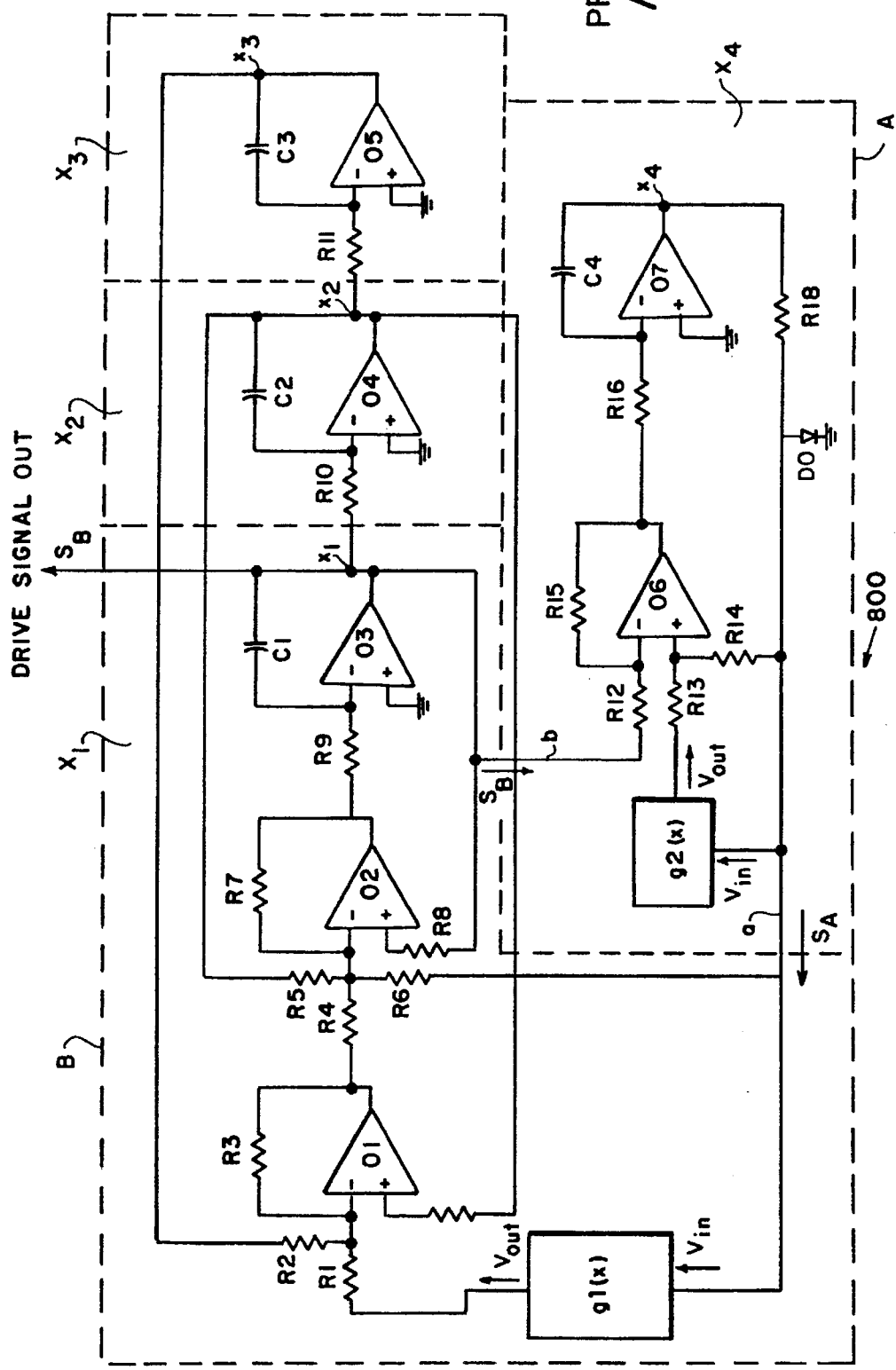
FIGS. 6–9 illustrate details of the prior art system of FIG. 5.

FIG. 5 functionally illustrates an example of a cascaded system. It includes a drive system 800 which includes elements $X_1$, $X_2$, $X_3$, and $X_4$ characterized by state variables $x_1$, $x_2$, $x_3$ and $x_4$, respectively, (FIG. 6). Element $X_4$ constitutes subsystem A, and elements $X_1$, $X_2$, $X_3$ constitutes subsystem B. Both subsystems A and B are stable, that is they have all negative sub-Lyapunov exponents. Subsystem A drives subsystem B with signal $S_A$ and subsystem B drives subsystem A with signal $S_B$. The response system 900 is a cascade of two subsystems A' and B" where the first subsystem system A' includes a single element $X_{4'}$, and the second subsystem B" includes three elements $X_{1''}$, $X_{2''}$ and $X_{3''}$. The first subsystem A' is a duplicate of the subsystem A in the drive system 800 and the second subsystem B" is a duplicate of the subsystem B in the drive system 800. The drive system 800 drives the first subsystem A' with signal $S_B$ and the first subsystem A' drives the second subsystem B" with signal $S_{A'}$. The second subsystem B" produces an output signal $S_{B''}$ in synchronization with drive signal $S_B$.

The operation of the elements in this example is modeled by the following equations:

$$dx_1/dt = -\alpha_1[\beta_1 A_1 x_1 - \gamma_1 x_2 + x_3 - x_4 + g_1(x_4) + \delta x_1], \quad (11)$$

$$dx_2/dt = -\alpha_2(x_1 + \delta x_2), \quad (12)$$

$$dx_3/dt = -\alpha_3(x_2 + \delta x_3), \quad (13)$$

$$dx_4/dt = -\alpha_4((-\beta_4/R_v)x_1 + \gamma_4 A_4 x_4 + g_2(x_4)), \quad (14)$$

$$dx''_1/dt = -\alpha_1[\beta_1 A''_1 x''_1 - \gamma_1 x''_2 + x''_3 - x'_4 + g_1(x'_4) + \delta x''_1], \quad (15)$$

$$dx''_2/dt = -\alpha_2(x''_1 + \delta x''_2), \quad (16)$$

$$dx''_3/dt = -\alpha_3(x''_2 + \delta x''_3), \quad (17)$$

$$dx'_4/dt = -\alpha_4((-\beta_4/R_v)x_1 + \gamma_4 A'_4 x'_4 + g_2(x'_4)), \quad (18)$$

where the $g_1$ and $g_2$ functions are defined as:

$$g_1(x) = \beta_5(|x-2.5|-|x+2.5|), \quad (19)$$

$$g_2(x) = \beta_6 x + \gamma_6(|x-1.3|-|x+1.3|) + \epsilon(|x-2.6|-|x+2.6|) \quad (20)$$

and the constants are $\alpha_1=1098$, $\alpha_2=10980$, $\alpha_3=4972$, $\alpha_4=10980$, $\beta_1=1.466$, $\gamma_1=2.466$, $\gamma_4=10^5$, $\gamma_4=0.5$, $\beta_5=0.5$, $\beta_6=0.5$, $\gamma_6=0.164$, and $\epsilon_6=0.361$. The constant $\delta$, set at 0.2, is a phenomenological damping constant used to account for leakage current in the capacitors. Its value was set to make the stability of eqns. (11)–(20) match the stability of the actual circuit. $A_1$ and $A_4$ are variable parameters normally set at 1.0.

As $R_v$ is decreased from 50,000 ohms to 46,000 ohms, the circuit goes from a limit cycle through a period doubling to a one-well chaotic attractor to a two-well chaotic attractor. With $R_v$ held constant the drive system 800 and response system 900 can produce a number of synchronized signals with the output $S_{B''}$ of the element B" being used to confirm synchronicity as previously discussed. If $R_v$ is varied information can be transferred.

FIGS. 6–9 illustrate the circuit details of an example of a system of FIG. 5 where multiple synchronized signals can be produced and synchronization verified. FIG. 6 depicts the details of the drive system 800. This circuit 800 includes the following particular circuit elements:

| | |
|---|---|
| Resistor R1 = 100kΩ | Resistor R11 = 221kΩ |
| Resistor R2 = 100kΩ | Resistor R12 = $R_v$ |
| Resistor R3 = 100kΩ | Resistor R13 = 100kΩ |
| Resistor R4 = 100kΩ | Resistor R14 = 200kΩ |
| Resistor R5 = 68.2kΩ | Resistor R15 = 100kΩ |
| Resistor R6 = 100kΩ | Resistor R16 = 100kΩ |
| Resistor R7 = 100kΩ | Resistor R17 = 100kΩ |
| Resistor R8 = 68.2kΩ | Resistor R18 = 100Ω |
| Resistor R9 = 1mΩ | |
| Resistor R10 = 100kΩ | |
| Capacitor C1 = 910pf | Capacitor C3 = 910pf |
| Capacitor C2 = 910pf | Capacitor C4 = 910pf. |

$R_v$ is selected from among 47.8 kΩ and 46.9 kΩ with 47.8 kΩ preferable. Resistor tolerances are preferably 1% and all capacitors are preferably 5% mica capacitors. The system also includes operational amplifiers 01, 02, 03, 04, 05, 06 and 07 all of which are 741 type amplifiers and diode DO which is an IN485B type. The circuit details of the functions g1(x) (eqn. 19) and g2(x) (eqn. 20) are depicted in the circuit diagrams of FIGS. 7 and 8, respectively.

Returning now to the example shown in FIG. 6, if one cuts the circuit at points a and b, the resulting systems A and B are stable. Subsystem B consisting of $X_1$, $X_2$, and $X_3$ can be driven with the $S_A$ signal from the full system. Subsystem A consisting of $X_4$ may be driven with the $S_B$ signal from the full circuit. When driving the B subsystem including elements $x_1$, $x_2$, and $x_3$, it does not actually matter whether the $S_A$ driving signal is coming from the full circuit or from an A (or A') subsystem synchronized to the full circuit. Conversely, when driving the A subsystem, it does not actually matter whether the $S_B$ driving signal is coming from the full circuit or from a B or B" subsystem synchronized to the full circuit. This arrangement, in which the stable subsystems are driven by signals from subsystems and not necessarily the full circuit, is called "cascaded synchronization".

Figure 7:
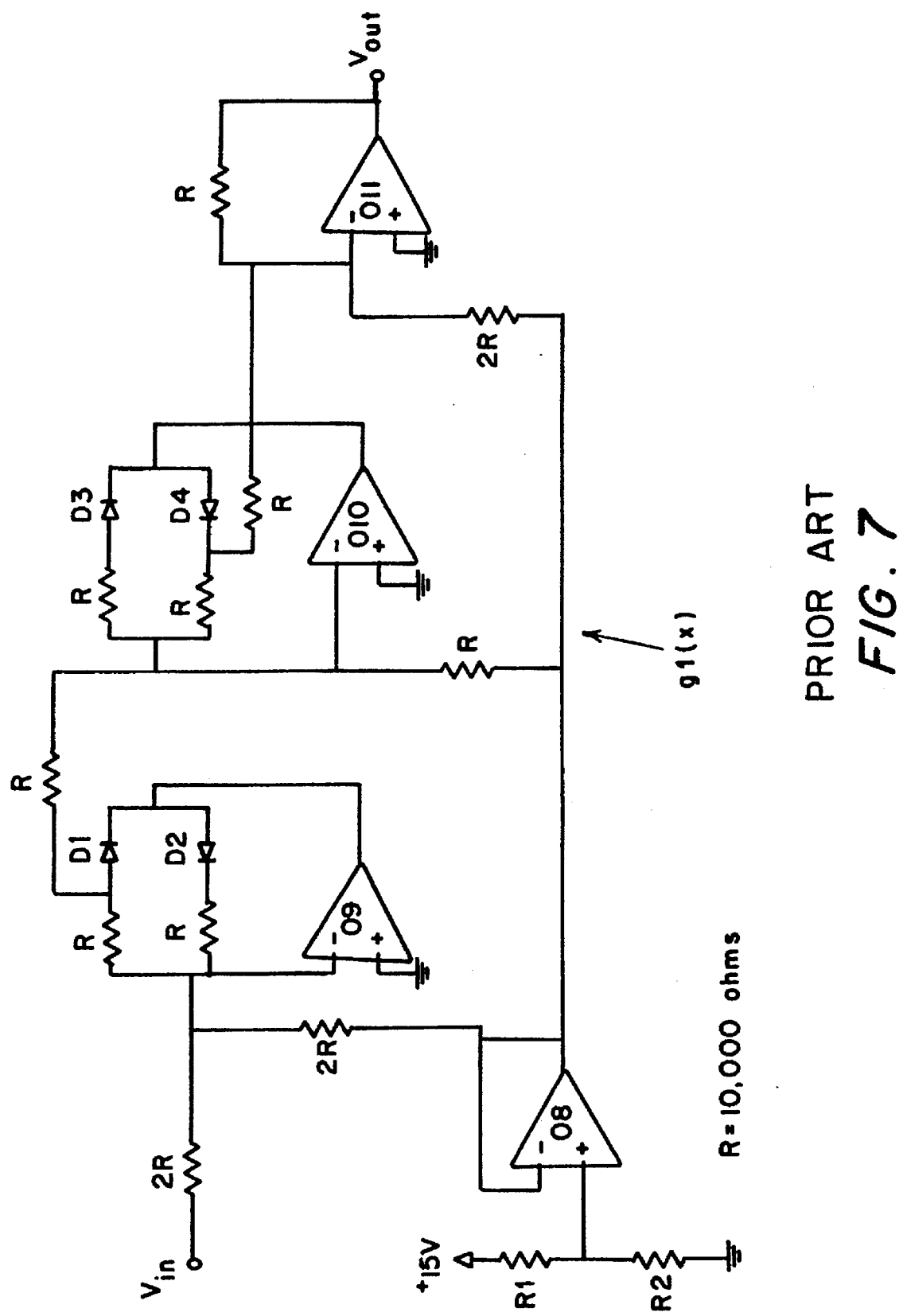

FIG. 7 depicts a circuit with response g1(x) (eqn. 19). In this circuit the resistors R=10 kΩ, the operational amplifiers 08, 09, 010 and 011 are 741 types and the diodes D1, D2, D3 and D4 are preferably type IN485B.

Figure 8:
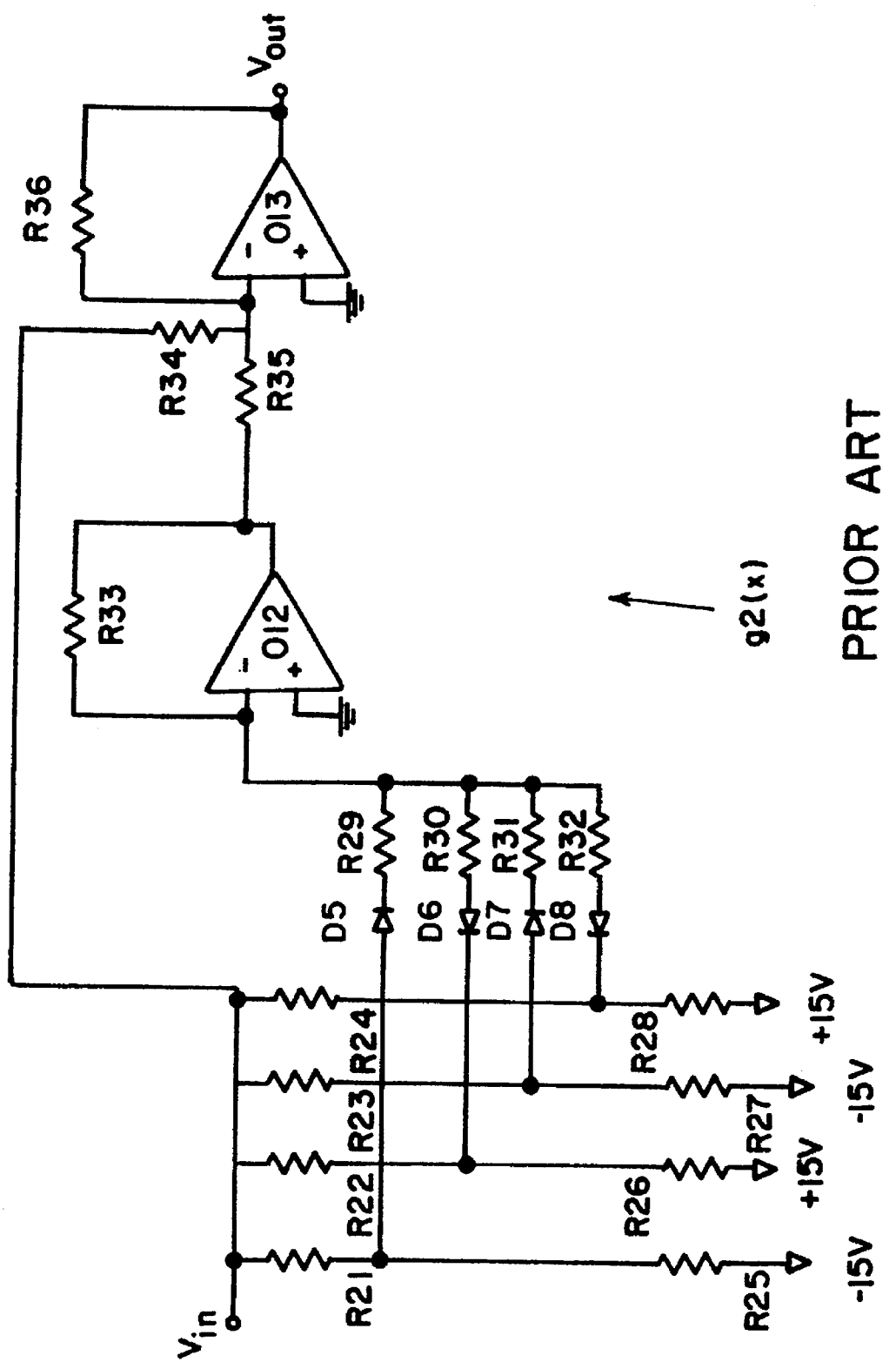

FIG. 8 depicts a circuit with response g2(x) (eqn. 20) where operational amplifiers 012 and 013 are 741 type amplifiers and

| | |
|---|---|
| Resistors R21 = 27.4kΩ | Resistors R29 = 50.1Ω |
| Resistors R22 = 27.4kΩ | Resistors R30 = 50.1Ω |
| Resistors R23 = 49.9kΩ | Resistors R31 = 50.1Ω |
| Resistors R24 = 49.9kΩ | Resistors R32 = 50.1Ω |
| Resistors R25 = 200kΩ | Resistors R33 = 20kΩ |
| Resistors R26 = 200kΩ | Resistors R34 = 178kΩ |
| Resistors R27 = 825kΩ | Resistors R35 = 156.2kΩ |
| Resistors R28 = 825kΩ | Resistors R36 = 100kΩ |

Diodes D5, D6, D7 and D8 are type IN485B.

Figure 9:
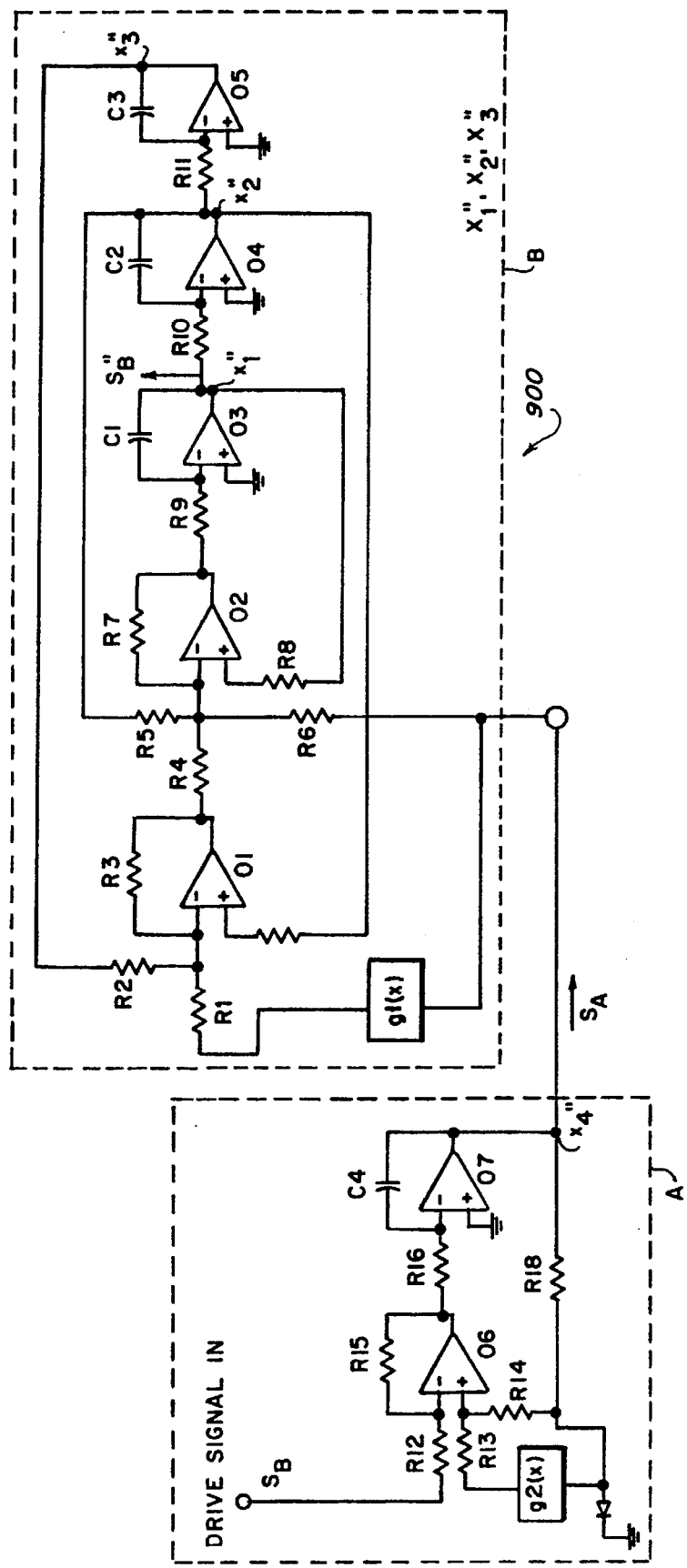

FIG. 9 depicts the circuit details of the response system 900 of FIG. 5. In this circuit 900 the resistor, capacitor, amplifier and function components are the same as previously discussed regarding FIGS. 6–8.

In FIG. 6 any of the nodes can be used as the source of the signals to be synchronized. However, the drive signal must come from a particular cut point as discussed above.

The above discussion of separated system synchronization is performed with electronic hardware components or other equivalent devices. Using the same concepts, systems can also be synchronized using software.

Figure 10:
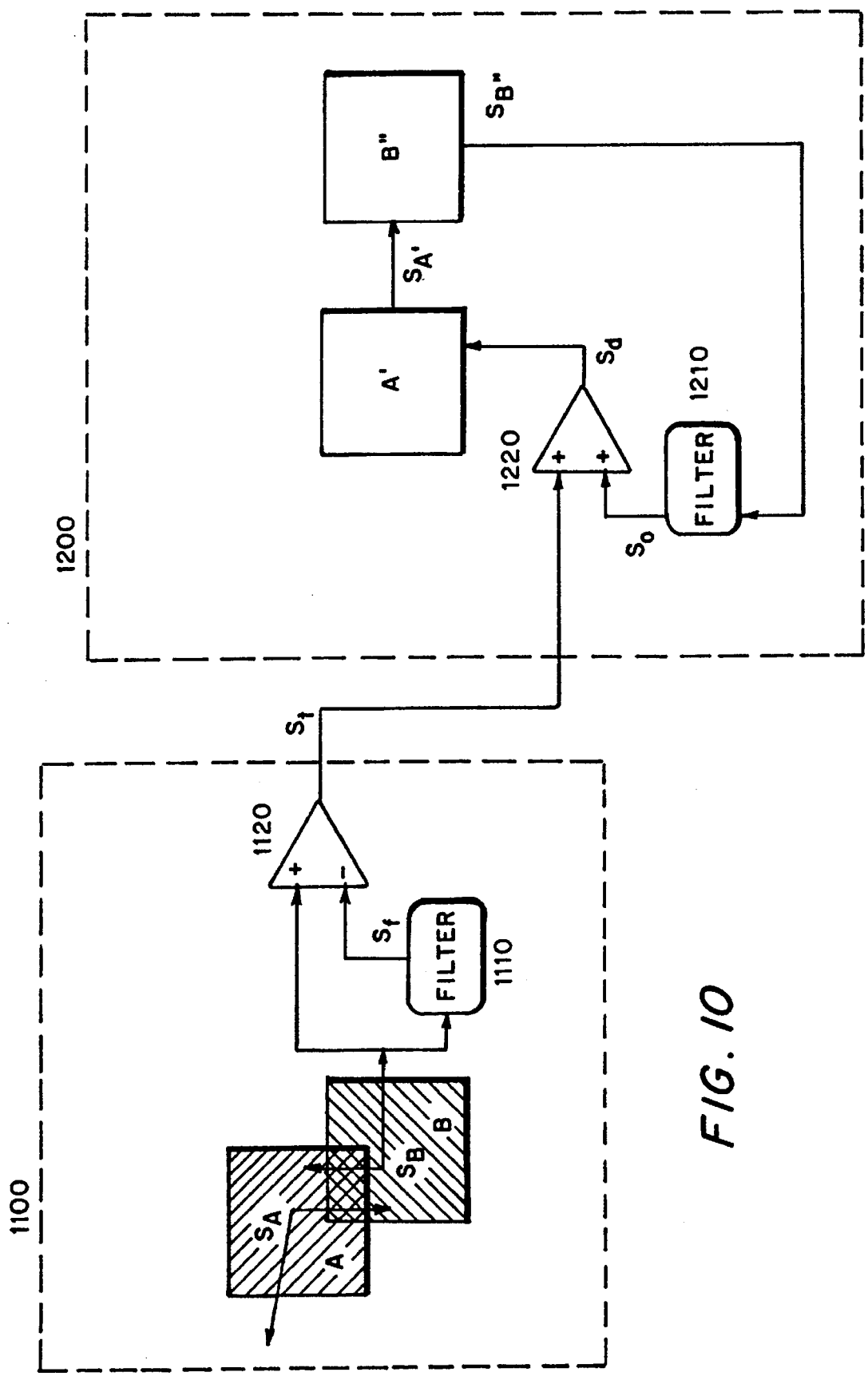
FIG. 10 is a block diagram of the present invention as applied to an autonomous nonlinear dynamical system.

FIG. 10 shows a filtered cascaded synchronized nonlinear system having a transmitter 1100 and a receiver 1200. The transmitter 1100 includes subsystems A and B which are independent and may or may not overlap. Subsystems A and B each contain 1 or more variables, that is, each subsystem is at least 1-dimensional but may contain more than 1 dimension. Neither subsystem A nor subsystem B is contained within the other subsystem. At least part of subsystem A is external to subsystem B and at least part of subsystem B is external to subsystem A. Subsystem A drives subsystem B with signal $S_A$ and subsystem B drives subsystem A with signal $S_B$. The signal $S_B$ is the input to filter 1110, and the output of filter 1110 is the signal $S_f$. The subtractor 1120 subtracts the filter output signal $S_f$ from $S_B$ to produce the broadcast signal $S_t$, which is transmitted to the receiver 1200.

The receiver 1200 is responsive to the broadcast signal $S_t$ and produces an output signal $S_{B''}$ in synchronization with signal $S_B$. The receiver 1200 consists of subsystem A' which is a duplicate of A and B" which is a duplicate of B. The broadcast signal $S_t$ is used as one input to the adder 1220. The output of the adder 1220 is the signal $S_d$. The signal $S_d$ is used to drive the subsystem A', and the output signal S. from subsystem A' is used to drive the subsystem B". Subsystem B" does not directly drive subsystem A', and the sub-Lyapunov exponents (as defined in U.S. Pat. Nos. 5,379,346 and 5,245,660) for subsystems A' and B" are all negative.

The signal $S_{B''}$ from subsystem B" is used as an input for the filter 1210, which is identical to the filter 1110 in the transmitter. The filter 1210 produces an output signal $S_o$ which is used as an input for the adder 1220.

When the receiver 1200 is synchronized to the transmitter 1100, then the signals in subsystem A' reproduce the signals in subsystem A and the signals in subsystem B" reproduce the signals in subsystem A. If the subsystems A' and B" and the filter 1210 are not exact replicas of the subsystems A,B and the filter 1100 (which will be the case in an electronic circuit implementation of the present invention), then the signals in A' and B" can be made arbitrarily close to the signals in A and B by making the differences between A and A', B and B", and filters 1110 and 1210 arbitrarily small.

In order to determine if the receiver 1200 will synchronize to the transmitter 1100, it is necessary to determine the stability of the receiver 1200 in the synchronized state. Techniques for determining the stability of such a system are well known; see, for example, J. M. T Thompson and H. B. Stewart, "Nonlinear Dynamics and Chaos", (Wiley, New York, 1986) or F. C. Moon, "Chaotic Vibrations", (Wiley, New York, 1987).

The synchronization of the receiver 1200 to the transmitter 1100 may be confirmed by comparing the receiver output signal $S_{B''}$ to the receiver driving signal $S_d$. When the receiver is synchronized to the transmitter, then signal $S_{B''}$ will match signal $S_d$.

Figure 11:
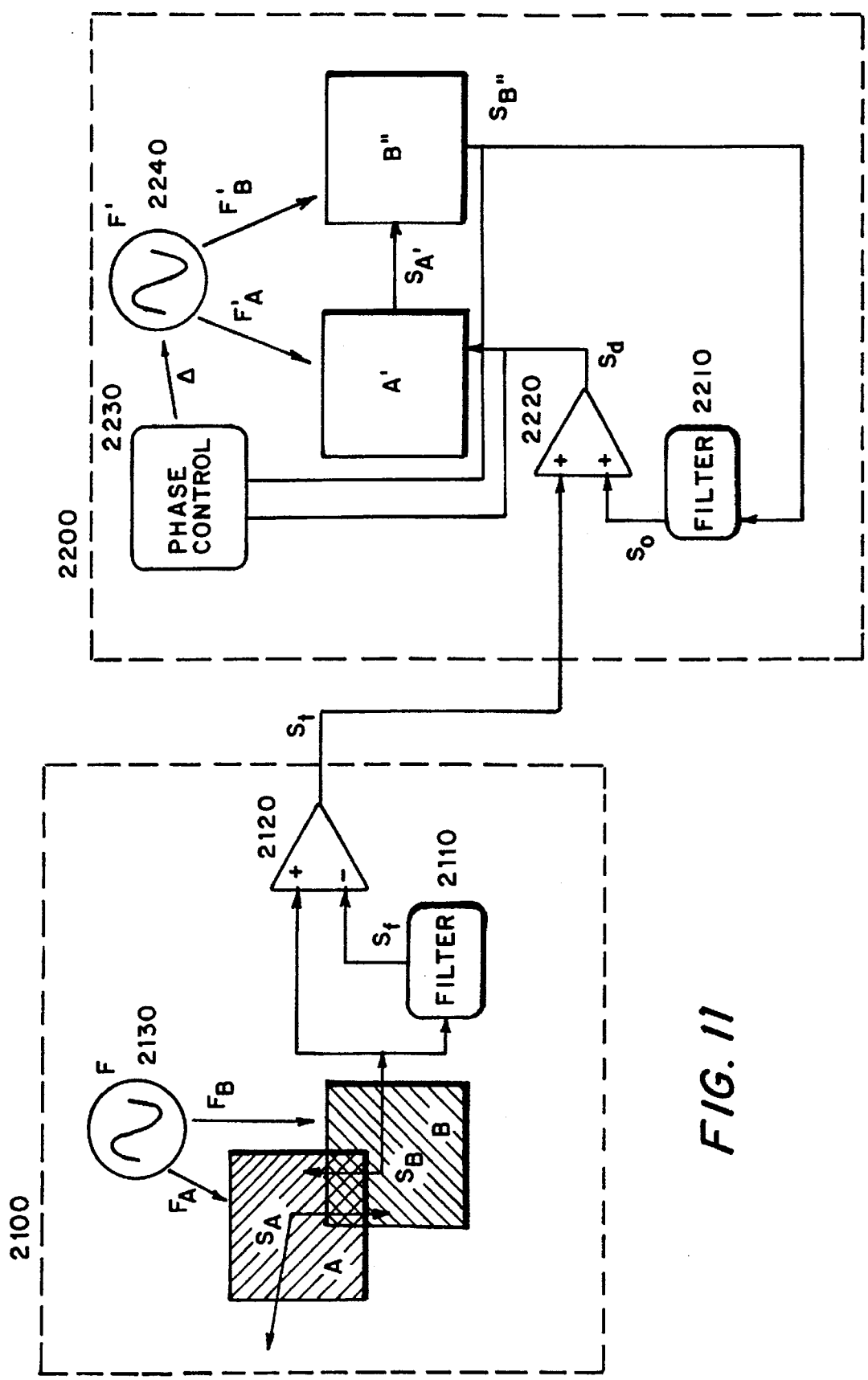
FIG. 11 is a block diagram of a second embodiment of the present invention as applied to a non-autonomous nonlinear dynamical system.

FIG. 11 shows a filtered cascaded synchronized nonlinear system having a transmitter 2100 and a receiver 2200 when the nonlinear systems are nonautonomous, that is, they have a periodic forcing part F (2130). The description of the transmitter 2100 is the same as the description of the transmitter 1100 in FIG. 10 except that the periodic forcing source F provides periodic forcing signals $F_A$ and $F_B$ to subsystems A and B. Either $F_A$ or $F_B$ may be zero, but they may not both be zero.

The receiver 2200 in FIG. 11 contains a periodic forcing source F' (2240) which provides the periodic forcing signal $F'_A$ to subsystem A' and periodic forcing signal $F'_B$ to subsystem B". If $F_A$ in transmitter 2100 is zero, then $F'_A$ in receiver 2200 is zero, and if $F_B$ in the transmitter 2100 is zero, then $F'_B$ in receiver 2200 is zero.

The receiver 2200 in FIG. 11 operates in the same manner as the receiver 1200 in FIG. 10, except that it is necessary to match the phase of the periodic forcing source F' (2240) in the receiver 2200 to the phase of the periodic forcing source F (2130) in the transmitter 2100. The receiver 2200 contains a phase control system 2230 responsive to signals $S_{B''}$ and $S_d$. The phase control system 2230 generates an error signal Δ proportional to the phase difference between F and F'. The periodic forcing source F' uses the error signal Δ to match the phase of F' to the phase of F. The procedures for producing the error signal Δ are described in U.S. patent application Ser. No. 08/267,696 (Navy Case No. 75,496), entitled: "SYNCHRONIZATION OF NONAUTONOMOUS CHAOTIC SYSTEMS", filed Jun. 29, 1994, Inventors: Thomas L. Carroll et al.

The systems in FIGS. 10 and 11 may be any nonlinear dynamical system or combination of systems, provided that they may be subdivided into stable subsystems. The systems may be electronic circuits, they may be sets of differential equations or recursion relations (maps) to be solved on a computer, they may be implemented in digital signal processing systems or other physical or electronic systems, or they may be any other physical system that can be broken into stable subsystems. The filters, adders and subtracters may also be electronic devices or they may be implemented as computer algorithms. It is also possible for part of the system to be of one type (such as a computer algorithm) and the other part of the system to be of some other type (such as an electronic circuit).

FIG. 12-18 show how the present invention may be built as an electronic circuit.

Figure 12:
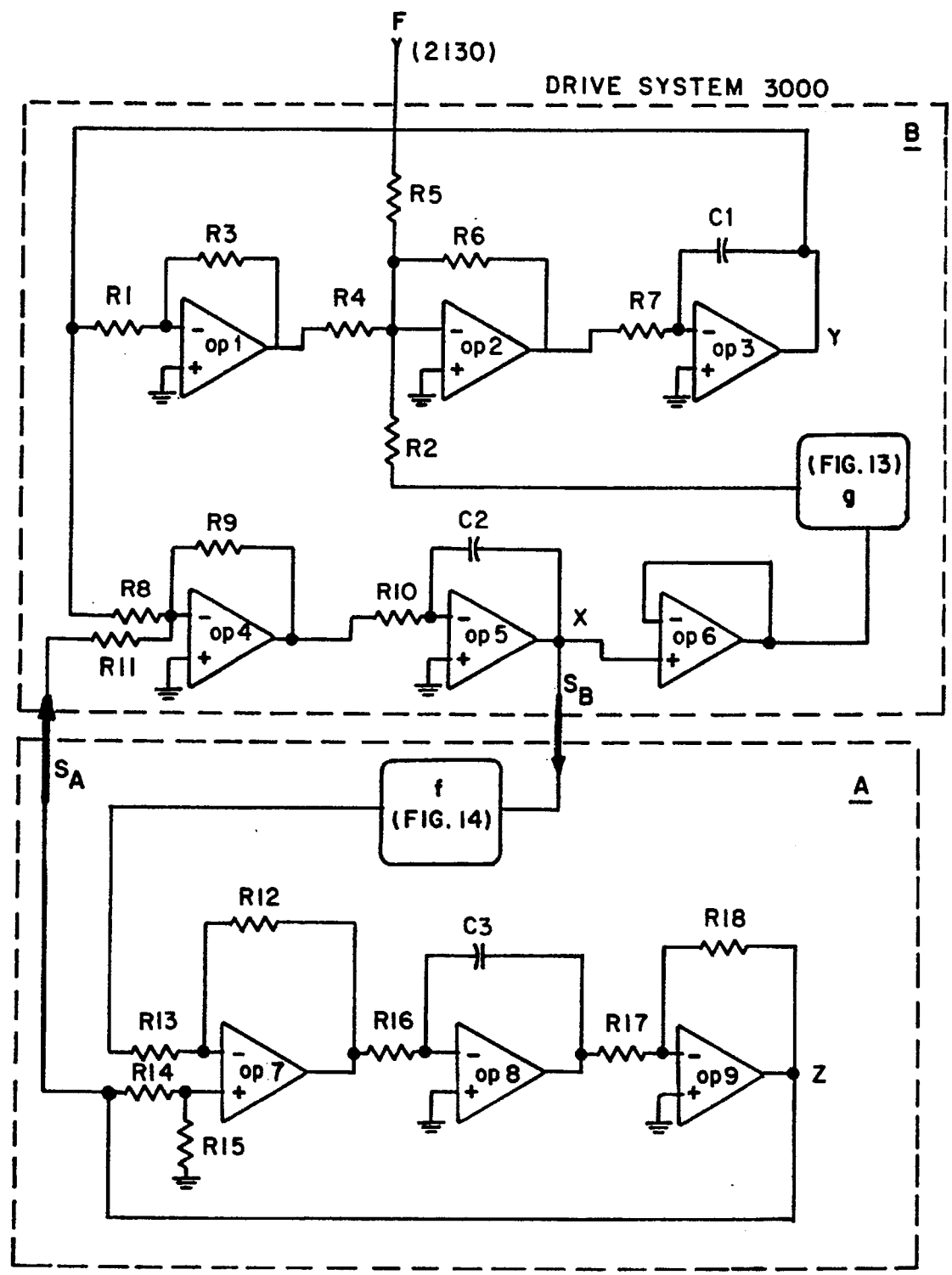
Figure 13:
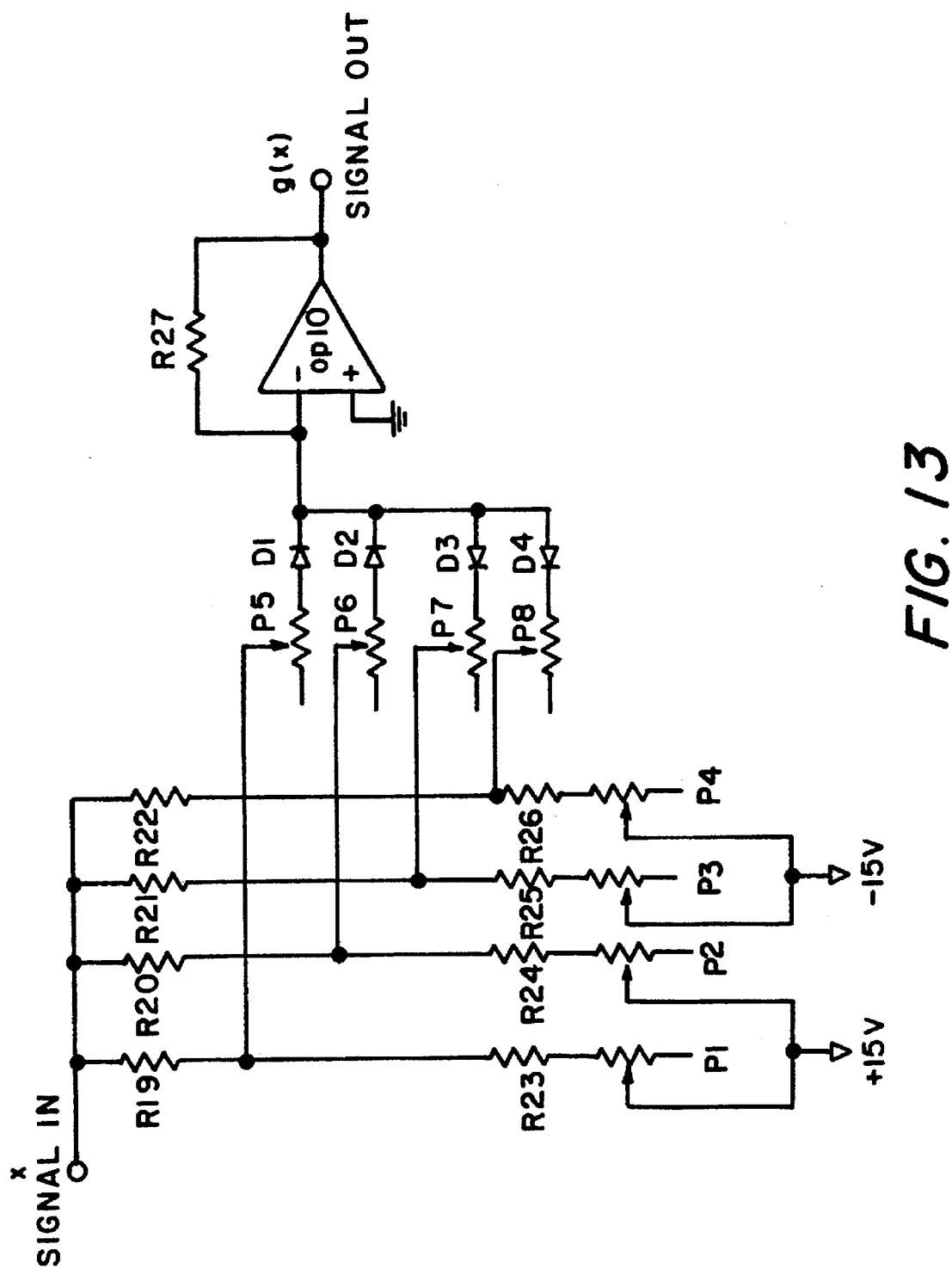
Figure 14:
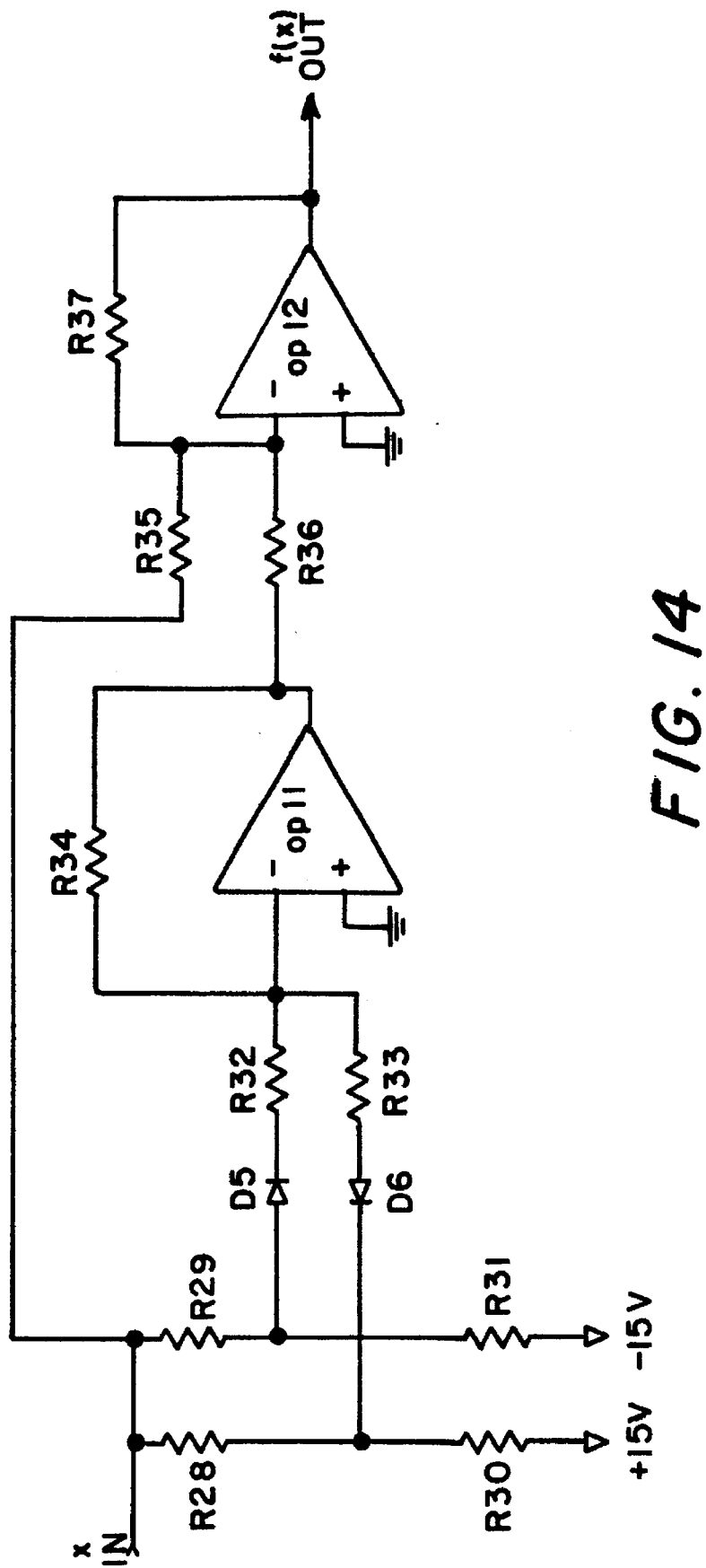

The circuit details of an electronic example of a chaotic circuit 3000 are shown in FIGS. 12, 13 and 14. This circuit 3000 includes the following particular circuit elements:

| | |
|---|---|
| Resistor R1 = 10kΩ | Resistor R2 = 39.2kΩ |
| Resistor R3 = 10kΩ | Resistor R4 = 10kΩ |
| Resistor R5 = 10kΩ | Resistor R6 = 10kΩ |
| Resistor R7 = 100kΩ | Resistor R8 = 1MΩ |
| Resistor R9 = 1MΩ | Resistor R10 = 100kΩ |
| Resistor R11 = 1MΩ | Resistor R12 = 100kΩ |
| Resistor R13 = 100kΩ | Resistor R14 = 100kΩ |

-continued

| | |
|---|---|
| Resistor R15 = 5.2kΩ | Resistor R16 = 100kΩ |
| Resistor R17 = 100kΩ | Resistor R18 = 1MΩ |
| Capacitor C1 = 1nF | Capacitor C2 = 1nF |
| Capacitor C3 = 1nF | |

Resistor tolerances are preferably 1% or better and all capacitors are preferably 5% mica capacitors. The system also includes operational amplifiers Op1, Op2, Op3, Op4, Op5, Op6, Op7, Op8 and Op9, all of which are 741 type amplifiers.

The circuit details of the circuit g of FIG. 12 is depicted in the circuit diagram of FIG. 13, having the following particular elements:

| | |
|---|---|
| Resistor R19 = 100kΩ | Resistor R20 = 100kΩ Resistor |
| R21 = 100kΩ | Resistor R22 = 100kΩ Resistor |
| R23 = 680kΩ | Resistor R24 = 2MΩ Resistor |
| R25 = 680kΩ | Resistor R26 = 2MΩ Resistor |
| R27 = 100kΩ | |
| Potentiometer P1 = 20kΩ | Potentiometer P2 = 50kΩ |
| Potentiometer P3 = 20kΩ | Potentiometer P4 = 50kΩ |
| Potentiometer P5 = 20kΩ in parallel with a 100Ω resistor (not shown) | Potentiometer P6 = 20kΩ in parallel with a 100Ω resistor (not shown) |
| Potentiometer P7 = 20kΩ in parallel with a 100Ω resistor (not shown) | Potentiometer P8 = 20kΩ in parallel with a 100Ω resistor (not shown) |

Resistor tolerances are preferably 1% or better. The system also includes operational amplifier Op10 which is a type 741, and diodes D1, D2, D3, and D4 which are of type 1N485B. As explained further below, the potentiometers $P_1$–$P_8$ are used to match different circuits g to each other.

The circuit details of the circuit f of FIG. 12 are depicted in the circuit diagram of FIG. 14, having the following particular elements:

| | |
|---|---|
| Resistor R28 = 10kΩ | Resistor R29 = 10kΩ |
| Resistor R30 = 490kΩ | Resistor R31 = 490kΩ |
| Resistor R32 = 50kΩ | Resistor R33 = 50kΩ |
| Resistor R34 = 20kΩ | Resistor R35 = 100kΩ |
| Resistor R36 = 100kΩ | Resistor R37 = 100kΩ. |

Resistor tolerances are preferably 1% or better. The system also includes operational amplifiers Op11 and Op12 which are of type 741, and diodes D5, and D6 which are of type 1N485B.

The circuit shown in FIGS. 12–14 is modeled by the following equations:

$$dx/dt=\beta[y-z] \quad (21)$$

$$dy/dt=\beta[-\Gamma_y \cdot y - g(x) + \alpha \cdot \cos(\omega_f \cdot t)] \quad (22)$$

$$dz/dt=\beta[f(x)-\Gamma_z z] \quad (23)$$

$$g(x)=-3.8+0.5*(|x+2.6|+|x-2.6|+|x+1.2|+|x-1.2|) \quad (24)$$

$$f(x)=0.5*x+|x-1|+|x+1|, \quad (25)$$

where $\alpha=2.0$, $\Gamma_y=0.2$, $\Gamma_z=0.1$, the time factor $\beta=10^4$/sec, and the angular frequency $\omega_f=2\pi f_f$, where the transmitter forcing frequency $f_f=769$ Hz. The cosine term in Equation (22) is provided by a signal $S_1$ supplied by an HP 3300A function generator 2130. The functions g(x) (equation (24)) and f(x) (equation (25)) are piecewise linear functions produced by the circuits shown in FIGS. 13 and 14, respectively. Equations (21–25) model the B subsystem (FIG. 11) of the transmitter 2100, and equation (23) models the A subsystem (FIG. 11) of the transmitter 2100.

This circuit is designed so that it is possible to create a synchronizing subsystem. Equations (21–22) (with z treated as a parameter) constitute the well known 1-well Duffing equations. For the parameter settings used here, the behavior of such a subsystem is periodic, indicating that the largest Lyapunov exponent for this subsystem is zero. Equation (23) was added to the Duffing system of Equations 21–22 to provide an instability for certain values of x, thereby leading to chaos. If the feedback loop between equations (21) and (23) were not completed, i.e. if the subsystem of equations (21–22) were not dependent on the z-variable produced by the subsystem of equation (23), or if the subsystem of equation (23) were not dependent on the x-variable produced by the subsystem of equations (21–22), then the system of variables x, y and z would be periodic. In other words variables x, y and z would each be periodic or a fixed point. The largest conditional Lyapunov exponent with respect to the signal $S_1$ would be less than or equal to zero. The feedback loop between equations (21) and (23) can be disconnected by cutting the system at node $T_1$ and grounding the input (x) to the circuit f, or by cutting the system at node $T_2$. Such disconnection would remove the dependence of equation (23) on the variable x, or the dependence of equation (21) on the variable z, respectively.

The conditional Lyapunov exponents for the transmitter system of FIGS. 12–14 calculated from equations (21–25) with the above parameters are $284s^{-1}$, $-1433s^{-1}$ and $-1854s^{-1}$. The sinusoidal forcing term $\cos(\omega_f \cdot t)$ of equation (22) is treated as a parameter in this calculation, so the zero exponent attributable to signal $S_1$ does not show up here. Since one of the conditional Lyapunov exponents is positive, therefore the system modeled by equations (21–25) and shown in FIGS. 12–14 operates in the chaotic regime.

In FIG. 15, R38=10,000 ohms, R39=10,000 ohms, R40=10,000 ohms, R41=10,000 ohms, R42=10,000 ohms, R43=5000 ohms, R44=10,000 ohms, R45=10,000 ohms and R46=10,000 ohms. In FIG. 16, resistor R47=31,380 ohms and C4=$10^{-8}$ F. All operational amplifiers are type 741.

The transmitter 6000 in FIG. 15 may be described by the following differential equations when the filter 4000 of FIG. 16 is used (equations 26–30):

$$dx/dt=\beta(y-z) \quad (26)$$

$$dy/dt=\beta-\Gamma_y y - g(x) + \alpha \cos(\omega t) + A \quad (27)$$

$$dz/dt=\beta f(x) - \Gamma_z z \quad (28)$$

$$du/dt=dx/dt - u/RC \quad (29)$$

$$s_f = x - u \quad (30)$$

$$dv/dt=dx''/dt - v/RC \quad (31)$$

$$s_d = s_f + v \quad (32)$$

$$dz''/dt=\beta f(s_d) - \Gamma_z z' \quad (33)$$

$$dx''/dt=\beta y'' - z' \quad (34)$$

$$dy''/dt=\beta-\Gamma_y y'' - g(x'') + \alpha \cos \omega_f t + \Phi r + A \quad (35)$$

$\alpha=1.9$, $\Gamma_y=0.2$, $\Gamma_z=0.1$, $A=0$, $\beta=10^4 s^{-1}$, $\omega=2\pi \times 780$ Hz.

Figure 17:
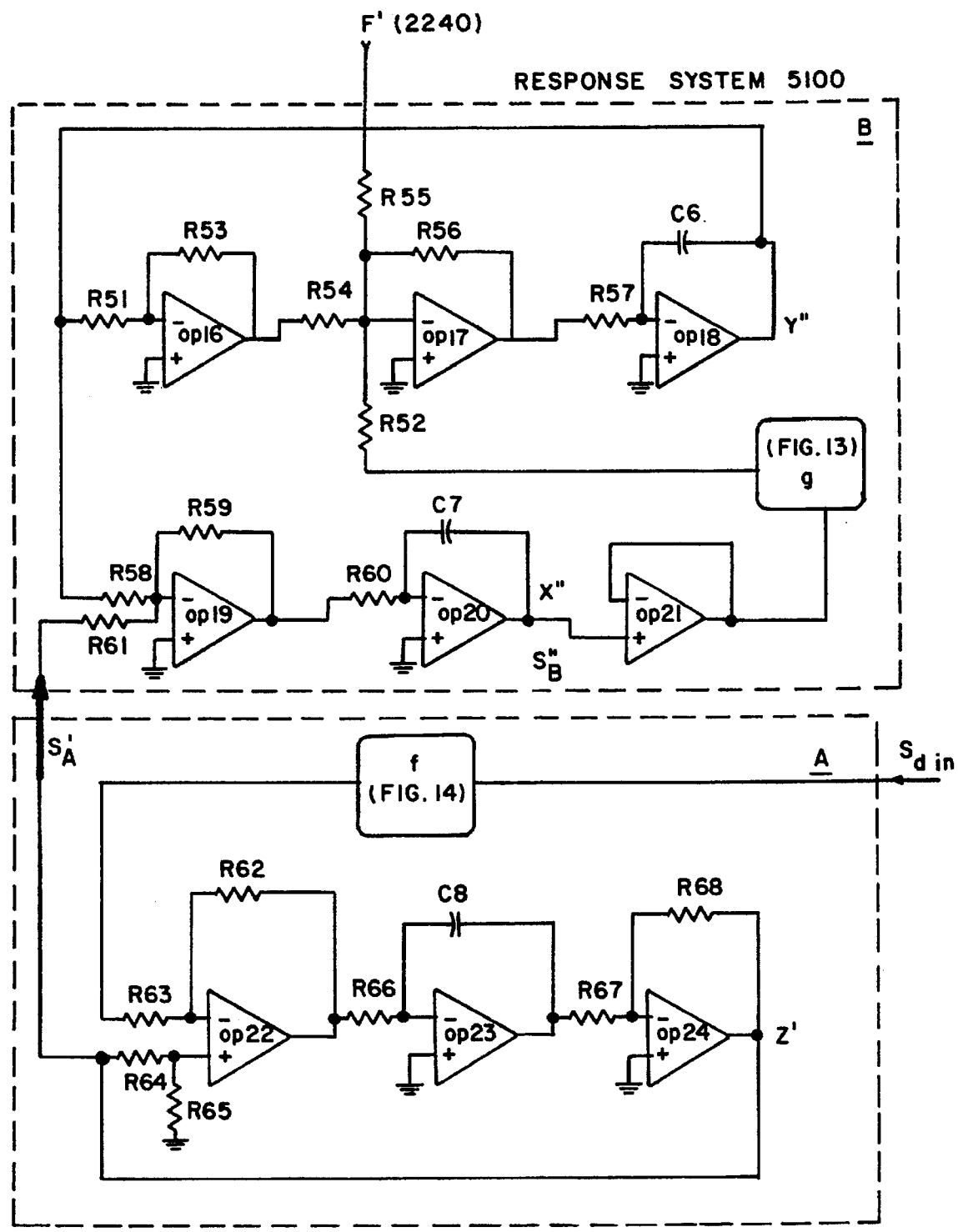
Figure 18:
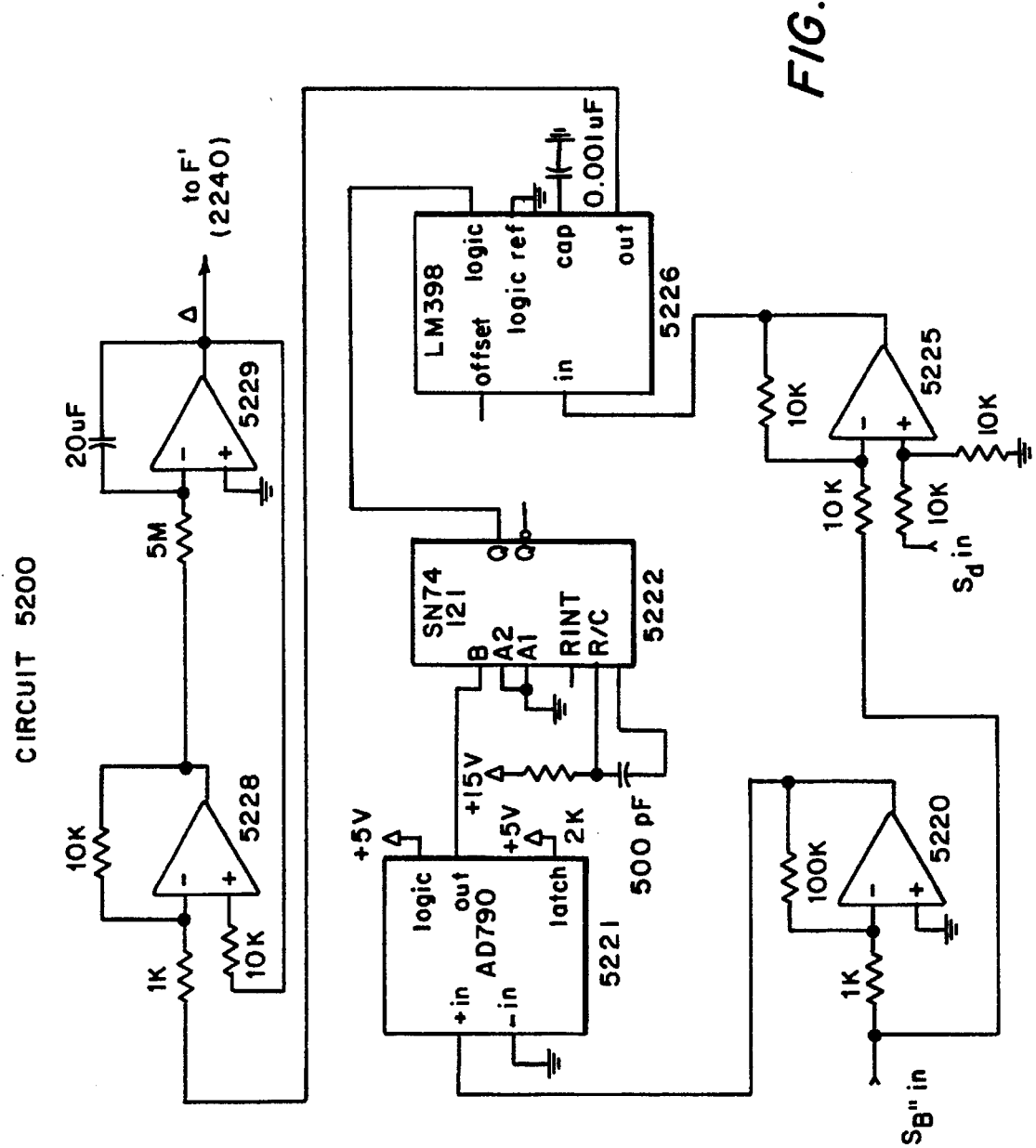

The receiver 7000 (FIG. 15) is shown in FIGS. 17 and 18. The receiver 7000 consists of a cascaded response circuit 5100 (FIG. 17) and a phase control circuit 5200 (FIG. 18), along with the filter 4000 (FIG. 16) and the adder formed by operational amplifier op14 (FIG. 15). The cascaded response circuit 5100 is described by equations 33–35. In FIG. 17, R51=10,000 ohms, R52=39,200 ohms, R53=10,000 ohms, R54=10,000 ohms, R55=10,000 ohms, R56=10,000 ohms, R57=100,000 ohms, R58=1,000,000 ohms, R59=1,000,000 ohms, R60=100,000 ohms, R61=1,000,000 ohms, R62=100,000 ohms, R63=100,000 ohms, R64=100,000 ohms, R65=5,200 ohms, R66=100,000 ohms, R67=100,000 ohms, R68=1,000,000 ohms, C6=1 nF, C7=1 nF, C8=1 nF. The phase control circuit 5200 is shown in FIG. 18.

Referring now to FIG. 18, the details of a phase-detector/controller 5200 is shown. This phase-detector/controller 5200 is responsive to the receiver drive signal $S_d$ and to the receiver output signal $S_{B''}$ for producing a correction signal $\Delta$ responsive to the phase difference between the transmitter forcing signal F1 and the receiver forcing signal $F^1$.

The strobe input signal $S_{B''}$ generated by the response system 5100 is applied to an amplifier 5220 with a high gain such as a 741 type amplifier with a gain of −100. The output of the amplifier 5220 is applied to a conventional comparator 5221, such as an AD 790. The comparator 5221 produces an output when the input signal $S_{B''}$ is less than zero. The positive-going signal from the comparator 5221 triggers a conventional Schmitt trigger circuit 5222, such as an SN 74121 monostable multi-vibrator. As a result, the Schmitt trigger circuit 5222 produces a pulse of about 1 microsecond (μs) duration when the strobe input signal $S_{B''}$ crosses 0 in the negative direction. A difference device 5225, such as a 741 operational amplifier, generates the difference signal $S_d-S_{B''}$ between the receiver drive signal $S_d$ and the strobe signal $S_{B''}$. The difference signal $S_d-S_{B''}$ produced by the difference device 5225 is applied to the signal input of a conventional sample and hold circuit 5226, such as an LM 398, and the output of the Schmitt trigger circuit 5222 is applied to the logic input of the sample and hold circuit 5226. In other words, the difference $S_d-S_{B''}$ between the receiver drive signal $S_d$ and the strobe signal $S_{B''}$ is applied to the sample and hold circuit 5226, which holds the difference seen when the strobe signal $S_{B''}$ passes through 0 going negative.

The sampled signal produced by the sample and hold circuit 5226 is applied to the negative terminal of a 741 type amplifier 5228, and the correction signal $\Delta$ is applied to the positive terminal of the amplifier 5228 thereby providing negative feedback. The amplifier 5228 thus accumulates the sampled difference signal and the correction signal $\Delta$. The correction signal $\Delta$ is produced by a conventional integrator 5229, having a long time constant preferably of about 10 seconds (s), such as type 741 amplifier with a mica capacitor used for feedback, that averages the output of the amplifier 5228. In other words, the output of the sample and hold circuit 5226 is applied to an integrator to produce a correction signal $\Delta$ proportional to the average phase difference transmitter forcing signal F and receiver forcing signal $F^1$.

Referring back to FIG. 11, a signal generator 2130 responsive to the correction signal $\Delta$ produced by the phase-detector/controller 2230 of FIG. 18 which is itself responsive to a receive drive signal $S_d$ produced by the circuit shown in FIG. 15 preferably utilizes an HP 8116A function generator (not shown). Such a signal generator 2130 multiplies the correction signal $\Delta$ produced by the phase-detector/controller 5200 of FIG. 18 by a factor of 1/100 and uses the resulting signal to modulate the frequency of the HP8116A function generator.

Figure 19:
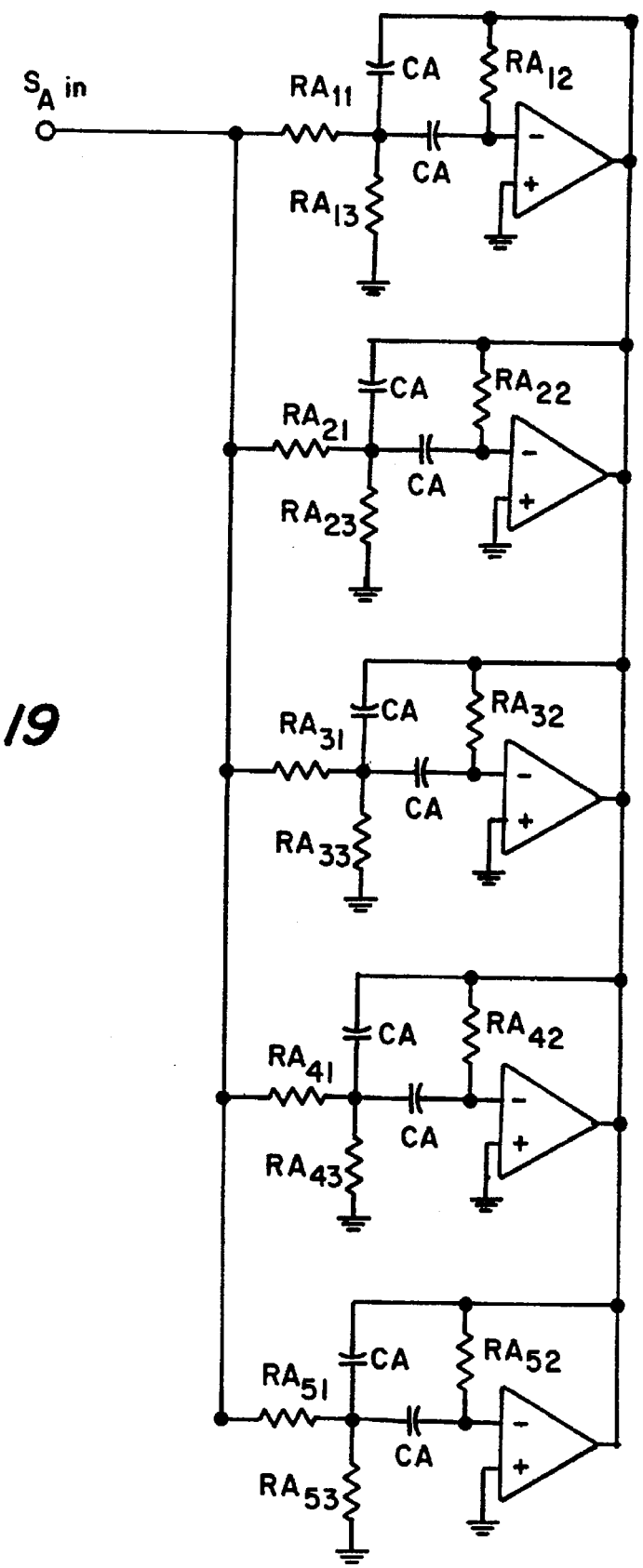
FIG. 19 shows a modification of FIG. 14 in which FIG. 19 replaces FIG. 16 to produce a third embodiment of the invention comprised of FIGS. 12–15 and 17–19.

The transmitter 2100 of eqs. 26–30 and the response system 2200 of eqs. 31–35 are not identical. The transmitter 2100 and receiver 2200 are effectively identical when they are synchronized. It is necessary for the synchronized state to be stable. A Lyapunov exponent calculation from the equations shows that the largest Lyapunov exponent in the response system is −319 s−1, indicating that the response system is stable. An alternate filter 4000 is shown in FIG. 19. The resistor values were given by $RA_{ij}=$:

|       | j = 1      | j = 2      | j = 3   |
|-------|------------|------------|---------|
| i = 1 | 204,000 Ω  | 408,000 Ω  | 1026 Ω  |
| i = 2 | 102,000 Ω  | 204,000 Ω  | 513 Ω   |
| i = 3 | 68,000 Ω   | 136,000 Ω  | 342 Ω   |
| i = 4 | 51,000 Ω   | 102,000 Ω  | 256 Ω   |
| i = 5 | 40,800 Ω   | 82,000 Ω   | 205 Ω   | and the capacitor CA was $10^{-8}$ F. This filter was described by the equations:

$$w = dx/dt \tag{36}$$

$$u_i/dt = -(2/R_{i2}C)u_i - (1/R_{i2}C)(1/(R_{i3}C + 1/R_{i1}C)v_i(1/R_{i1}C) \tag{37}$$

$$dv_i/dt = u_i \tag{38}$$

$$s_f = x + \Sigma v_i \tag{39}$$

$$s_d = s_f - \Sigma r_i \tag{40}$$

$$dq_i/dt = -(2/R_{i2}C)q_i - (1/R_{i2}C)(1/(R_{i3}C) + 1/(R_{i1}C))r_i - (1/R_{i1}C)dx''/dt \tag{41}$$

$$dr_i/dt = q_i \tag{42}$$

where the resistor values are given by the above table. The largest Lyapunov exponent for the response system when alternate filter 4000 was used was found to be −10 s−1, indicating that the response system was stable. The transmitter filter output signal v was added to the drive output signal x in equation 39 because the filter of equations 37 and 38 inverted the input signal. For the same reason, the receiver filter output signal was subtracted from the transmitted signal in equation 40.

Figure 20:
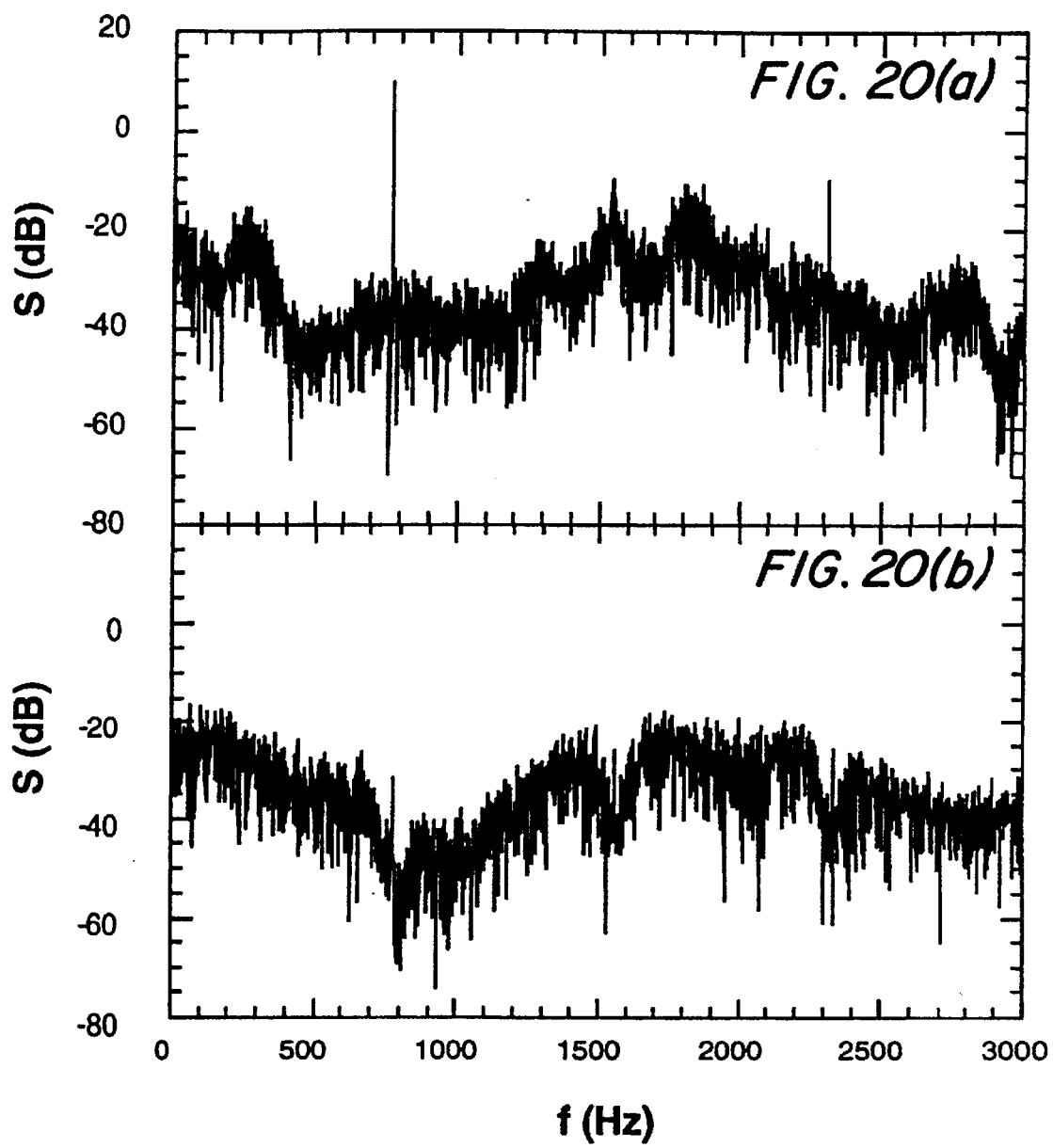
FIG. 20(a) illustrates the power spectrum of the x signal from the drive system circuit 3000 (FIG. 12) described by equations 26–28.
FIG. 20(b) illustrates the power spectrum of the broadcast signal $s_t$ from the transmitter filter circuit (FIG. 19) described by equations 37–39.

FIG. 20(a) shows the power spectrum of the drive system output signal x from equation 26, while FIG. 20(b) shows the power spectrum of the transmitted signal $s_t$ described in equation 30, demonstrating the change in the power spectrum caused by the filtering.

It may be shown that this technique also allows phase synchronization of the periodic forcing parts of nonautonomous synchronized nonlinear systems. The controller 5200 of FIG. 18 was used to control the phase of the response circuit periodic forcing to match that of the drive circuit. The controller 5200 generated a series of voltages that corresponded to the value of the response system output signal x" when the input signal $s_d$ crossed zero. If the drive and response circuits were synchronized, these voltages would all be zero. An integrator 5229 with a time constant of 1 s averaged the series of voltages to produce an error signal $\Delta$, which was used to vary the frequency of the response periodic forcing 2240 to bring the phase into sync with the drive periodic forcing 2130.

Figure 21:
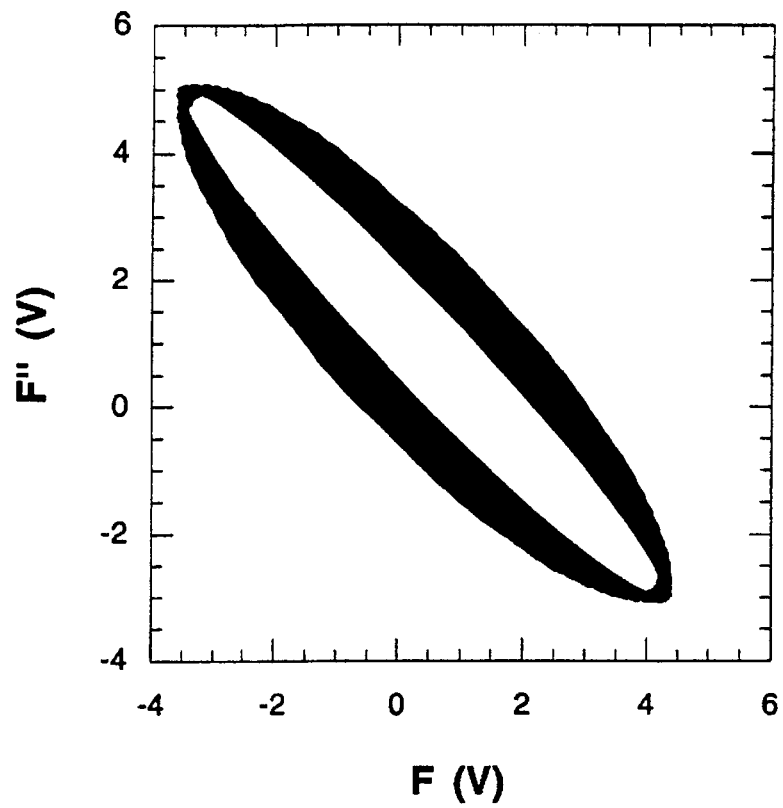
FIG. 21 shows the receiver forcing signal F" (2240) vs. the transmitter forcing signal F (2130) from the circuit implementation of the present invention when the band-stop filter arrangement of FIG. 19 is used.

FIG. 21 shows the periodic forcing F" for the response vs. the periodic forcing F for the drive. There is some fluctuation of the response phase and a constant phase offset which is an artifact of the control circuit, but the basic principle works. This demonstrates that the nonperiodic part of the chaotic signal carries information about the phase of the periodic part. Most of the phase fluctuation is believed to be caused by component mismatch between the two circuits. There is also a phase flip caused by a sign change in the filters.

Several authors have demonstrated communication between cascaded chaotic circuits via parameter switching in the sending circuit [U. Parlitz, L. O. Chua, L. Kocarev, K. S. Halle, K. Shang, Transmission of Digital Signals by Chaotic Synchronization, International Journal of Bifurcations and Chaos, vol. 2, p. 973 (1992)]. Parameter switching may also be used with the filtered nonautonomous chaotic circuits. The forcing offset A in eq. 27 was switched between ±1.0 V, and the parameter switching was detected by monitoring the error signal Δ generated by the controller 5200.

Figure 22:
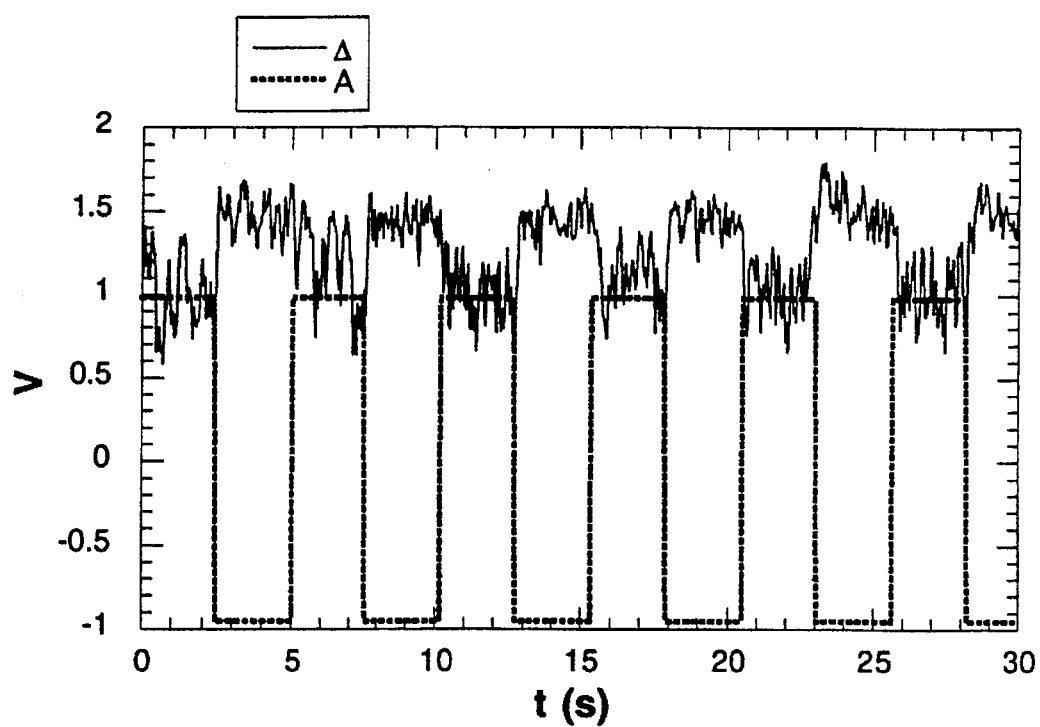
FIG. 22 illustrates a dotted line showing the value of a parameter A in the drive system circuit 3000 of FIG. 12 that was varied and the solid line shows the value of the error signal Δ from the phase control circuit 5200 when a set of nonautonomous circuits were synchronized according to the block diagram of FIG. 11.

FIG. 22 shows the offset signal A as a time series and the resulting error signal Δ coming from the response system controller. As may be seen by the sharp edges on the error signal transitions, the offset signal could be switched up to a factor of about 4 faster. The switching speed is limited by the time constant of the integrator that produces Δ, about 1 s for this system.

Autonomous nonlinear systems may also be synchronized when the driving signal is filtered. The Piecewise Linear Rossler (PLR) system is a nonlinear system that may be synchronized in a cascaded fashion (T. L. Carroll, "A simple circuit for demonstrating regular and synchronized chaos", American Journal of Physics, vol 63, #4, pp. 377–379, April 1995). A bandpass filter was used to isolate a large periodic component in the output of the PLR circuit and reduce its presence in the transmitted signal. Reducing the size of the periodic component reduced the power contained in the transmitted signal by a large amount, so that the transmitted signal could be sent with less power. The PLR system and the filter were described by the equations:

$$dx/dt = -500(x+10y+20z)$$

$$dy/dt = -10^4(-x-0.13y+0.02y)$$

$$dz/dt = -10^4(z-g(x)) \quad (43)$$

$$du/dt = -800u - 5 \times 10^7 v - 400(dy/dx)$$

$$dv/dt = u \quad (44)$$

$$y_t = y + 1.5v \quad (45)$$

$$dw/dt = -800w - 5 \times 10^7 r - 400(dy'/dt)$$

$$dr/dt = w \quad (46)$$

$$y_d = y_t - 1.5r \quad (47)$$

$$dx'/dt = -500(x'10y' + 20z')$$

$$dy'/dt = -10^4(-x'-0.13y_d + 0.02y')$$

$$dz'/dt = -10^4(z'-g(x')) \quad (48)$$

$$g(x) = 0 \text{ if } x<3, 15(x-3) \text{ otherwise} \quad (49)$$

Equations 43 are the drive system and equations 44 and 45 are the drive system filter. Equations 48 are the response system and equations 46 and 47 are the response system filter. The transmitter filter output signal v was added to the drive output signal y in equation 45 because the filter of equations 44 inverted the input signal. For the same reason, the receiver filter output signal was subtracted from the transmitted signal in equation 47. Equation 49 is the nonlinear function g(x). Equations 43–49 form an embodiment of the present invention as a complete algorithm.

Figure 23:
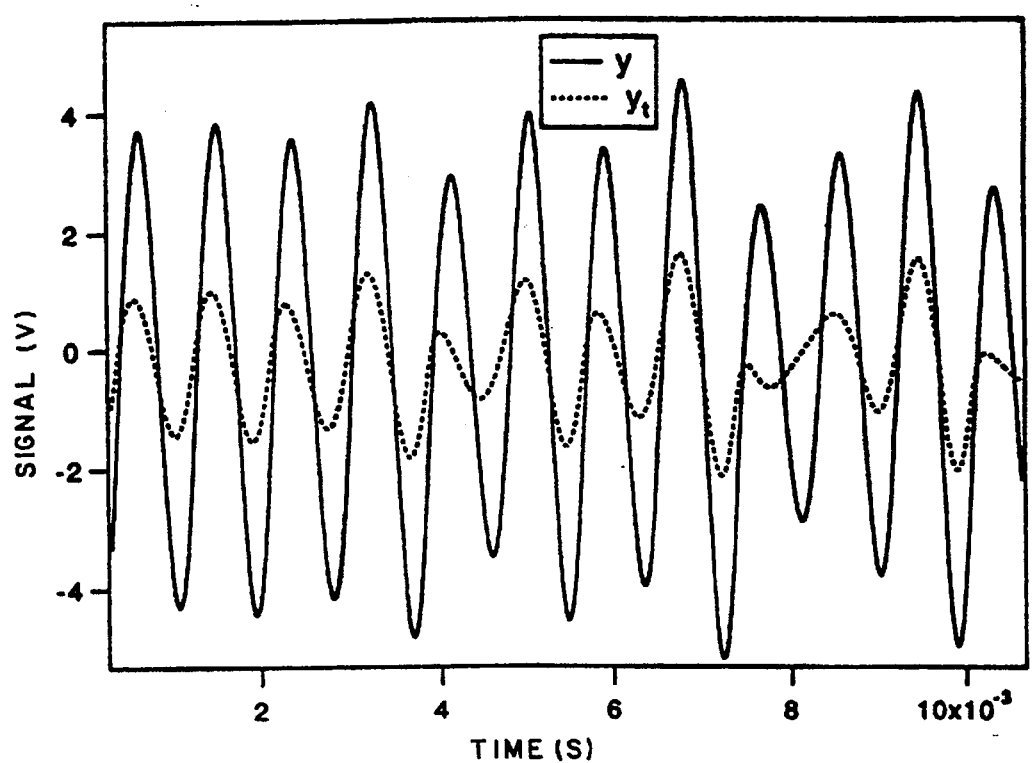
FIG. 23 shows a solid line representing a time series of the numerical output of the y signal from a 4-th order Runge-Kutta integration routine executed on a digital computer to simulate the system of equations 43, and a dotted line representing the signal broadcast signal $y_t$ from the filter of equations 44 and 45.
Figure 24:
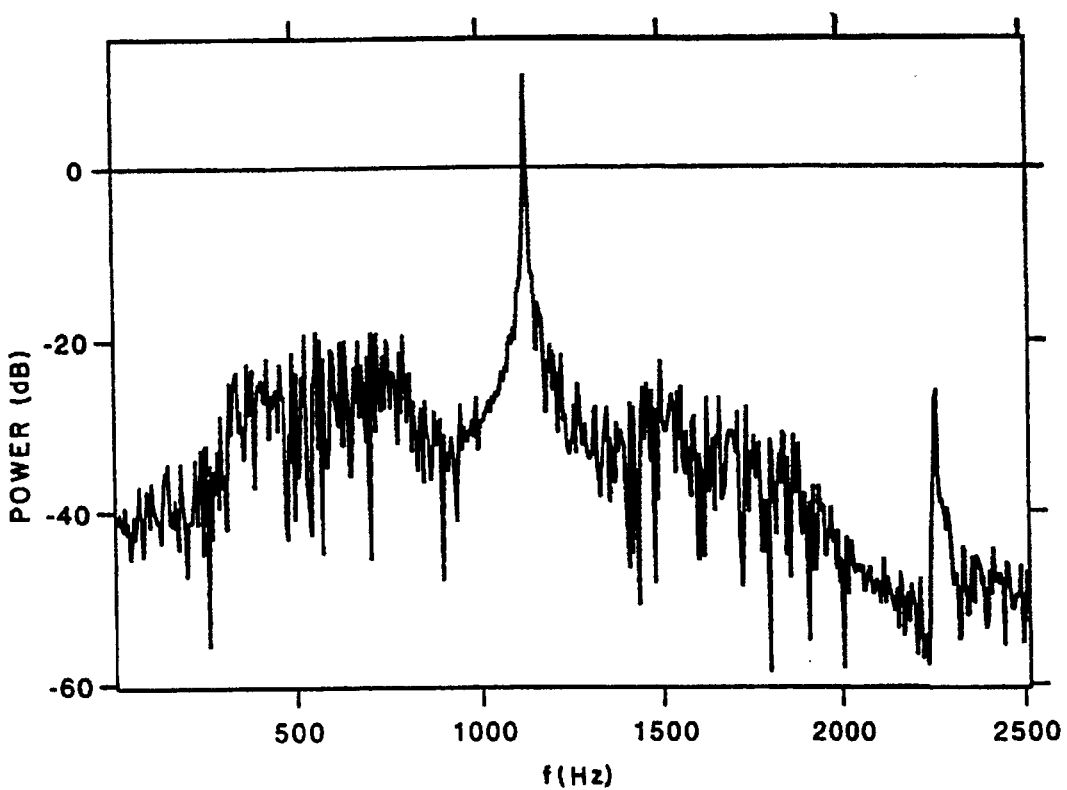
FIG. 24 shows a power spectrum of the numerical y signal from equations 43.
Figure 25:
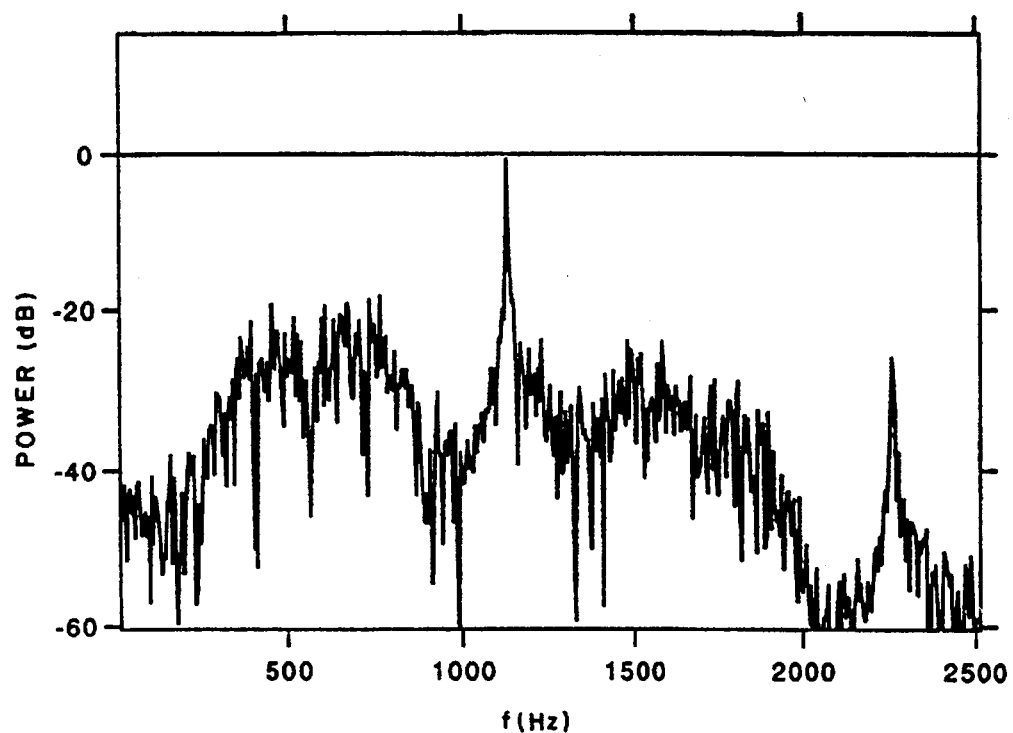
FIG. 25 shows a power spectrum of the broadcast signal $y_t$ from equation 45.

FIG. 23 shows the output signal (the y signal) from the drive system of equations 43 (the solid line in FIG. 23). This signal has a large periodic component, as may be seen in the power spectrum of the y signal in FIG. 24. The bandpass filter of equations 44 is tuned to this periodic component. The filter output signal v is then subtracted from the drive system output signal y to give the transmitted signal $y_t$. The transmitted signal $y_t$ is shown as a dotted line in FIG. 23. The power spectrum of the transmitted signal $y_t$ from equation 45 is shown in FIG. 25. The numerical integration routine generated 20,000 point output time series of y and $y_t$ were squared and integrated to give an estimate of the power in each signal. The power in the y signal was 155,371 (arbitrary units), while the power in the $y_t$ signal was 15,941 (arbitrary units). Filtering of the y signal to produce the $y_t$ signal reduced the power contained in the signal by a factor of approximately 10, reducing the power that must be transmitted.

The receiver is composed of equations 46, 47, 48 and 49. The filter output signal r is subtracted from the transmitted signal $y_t$ to produce the receiver driving signal $y_d$ (equation 47). The driving signal $y_d$ is then used to drive the cascaded response system of equations 48 to produce the response system output signal y'. The derivative of the response system output signal y' is used to drive the receiver filter of equations 46 to produce the filter output signal r.

Figure 26:
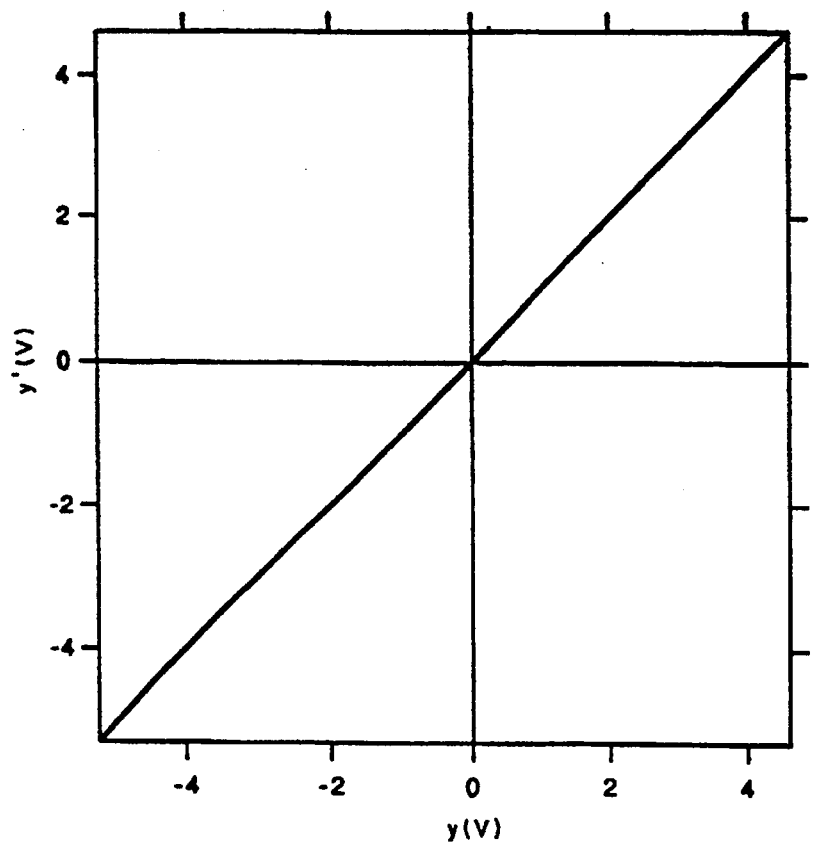
FIG. 26 shows the numerical response system output signal y" from equation 48 vs the drive system output signal y from equation 43.

FIG. 26 shows the response system output signal y' vs. the drive system output signal y to demonstrate that the drive and response systems are indeed synchronized.

Figure 27:
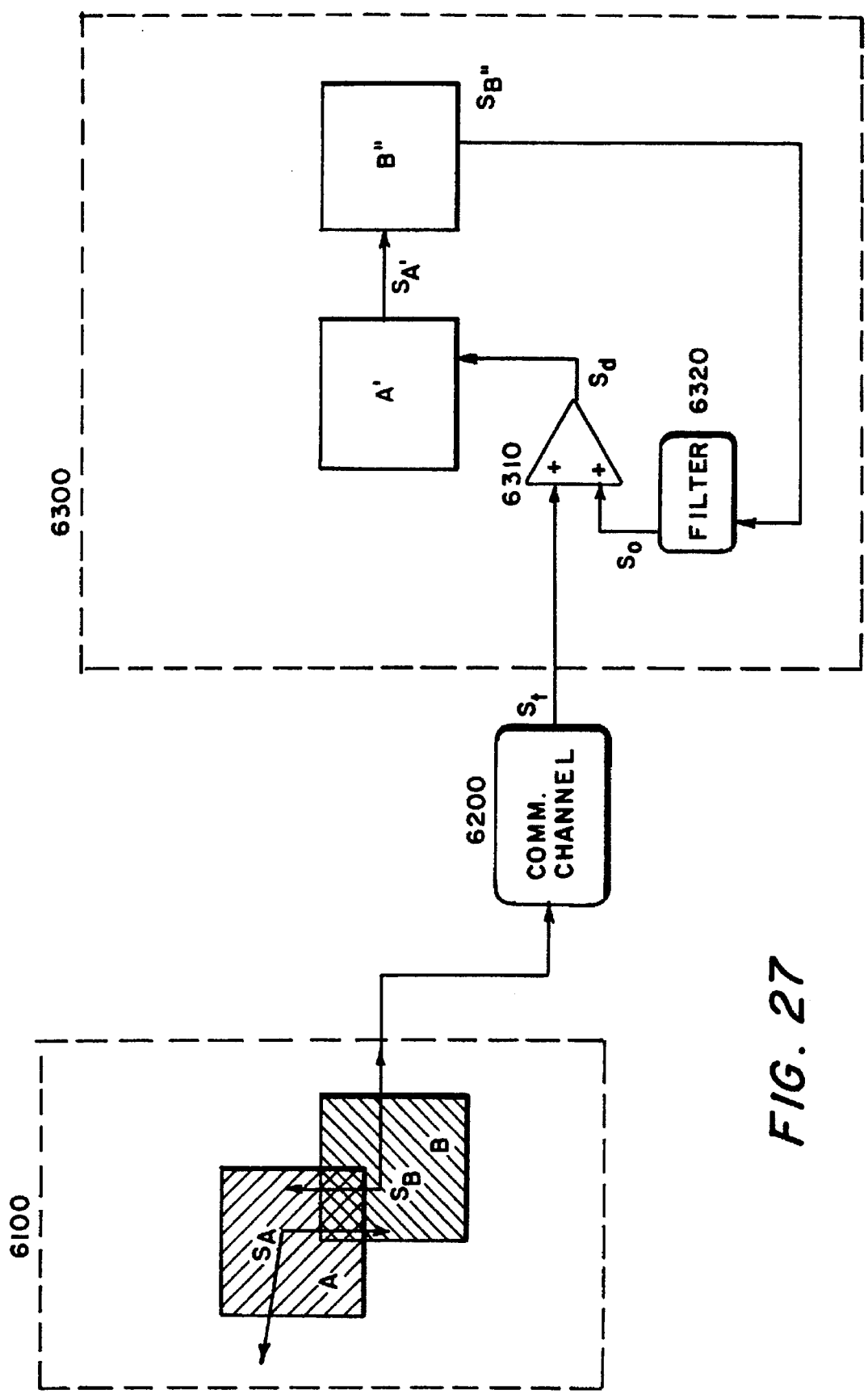
FIG. 27 illustrates a block diagram of a fourth embodiment of the present invention to correct for channel filtering effects.

The filtered synchronized communications system may also be used to correct for the effects of filtering by the communications channel. FIG. 27 shows a transmitter 6100 which sends a signal to a receiver 6300 through a communications channel 6200. If the effect of the communications channel is to filter the signal $S_B$ with a filter of the form (1-F) to produce a signal $S_r$, then the effect of the communications channel filtering may be removed by using a filter F for filter 6320 in receiver 6300.

Therefore, what has been described in a preferred embodiment is a filtered cascaded synchronized nonlinear system which includes a nonlinear transmitter having stable first and second subsystems. The first subsystem produces a first transmitter signal for driving the second subsystem, and the second subsystem produces a second transmitter signal for driving the first subsystem. A first filter filters the second transmitter signal to produce a filter output signal. A subtractor subtracts the filter output signal from the second transmitter signal to produce a transmitter output signal which is transmitted to a nonlinear cascaded receiver. The receiver includes an adder for summing the received transmitter output signal with a receiver filter output signal to restore frequencies that were subtracted from the second transmitter signal in order to produce a first receiver drive signal. The receiver includes cascaded third and fourth subsystems that are respective duplicates of the first and second subsystems. The third subsystem is driven by the first receiver drive signal to produce a first receiver signal in synchronization with the first transmitter signal. The fourth subsystem is driven by the first receiver signal to produce a second receiver signal in synchronization with the second transmitter signal. A second filter filters the second receiver signal to produce the receiver filter output signal.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letter Patent of the United States is:

1. A filtered cascaded synchronized nonlinear system comprising:
   a nonlinear transmitter comprising:
      stable first and second subsystems, said first subsystem producing a first transmitter signal for driving said second subsystem, and said second subsystem producing a second transmitter signal for driving said first subsystem;

first means for filtering the second transmitter signal to produce a filter output signal; and second means responsive to the second transmitter signal and the filter output signal for producing a transmitter output signal; and a nonlinear cascaded receiver comprising:

third and fourth cascaded subsystems being respective duplicates of said first and second subsystems;

third means responsive to the transmitter output signal from said second means and to a receiver filter output signal for producing a first receiver drive signal to drive said third subsystem to produce a first receiver signal in synchronization with the first transmitter signal to drive said fourth subsystem;

said fourth subsystem being responsive to the first receiver signal for producing a second receiver signal in synchronization with the second transmitter signal; and fourth means responsive to said second receiver signal for producing the receiver filter output signal.

2. The filtered cascaded synchronized nonlinear system of claim 1 wherein:

at least part of said first subsystem is external to said second subsystem, and at least part of said second subsystem is external to said first subsystem.

3. The filtered cascaded synchronized nonlinear system of claim 1 wherein:

said second means is a subtractor for subtracting the filter output signal from the second transmitter signal to produce the transmitter output signal;

said third means is an adder for summing the receiver filter output signal with the transmitter output signal to produce the first receiver drive signal; and each of said first and fourth means is a filter.

4. The filtered cascaded synchronized nonlinear system of claim 1 wherein:

said nonlinear transmitter further includes:

first periodic forcing means for respectively providing phase coherent, periodic first and second forcing signals to said first and second subsystems to force said first and second subsystems to oscillate, at least one of the first and second forcing signals having a non-zero value; and said nonlinear receiver further includes:

second periodic forcing means for respectively providing phase coherent, periodic third and fourth forcing signals to said third and fourth subsystems to force said third and fourth subsystems to oscillate, all of said first, second, third and fourth forcing signals being phase coherent with each other; and phase control means being responsive to the first receiver drive signal and the second receiver signal for producing and applying an error signal to said second periodic forcing means, the error signal being proportional to the phase difference between said second periodic forcing means and said first periodic forcing means, said second periodic forcing means being responsive to the error signal for matching the phase of the second periodic forcing means to the phase of said first periodic forcing means, said nonlinear receiver becoming synchronized to the nonlinear transmitter when the phase of the second periodic forcing means in said nonlinear receiver matches the phase of the first periodic forcing means in said nonlinear transmitter.

5. The filtered cascaded synchronized nonlinear system of claim 4 wherein:

said nonlinear receiver is synchronized to said nonlinear transmitter when the second receiver signal matches the first receiver drive signal.

6. A filtered cascaded synchronized nonlinear system comprising:

a nonlinear transmitter comprising:

stable first and second subsystems, said first subsystem producing a first transmitter signal for driving said second subsystem, and said second subsystem producing a second transmitter signal for driving said first subsystem;

first means for removing undesired frequencies from the second transmitter signal to produce a transmitter output signal;

a nonlinear cascaded receiver comprising:

third and fourth cascaded subsystems being respective duplicates of said first and second subsystems;

second means responsive to the transmitter output signal from said first means and to a receiver filter output signal for producing a first receiver drive signal to drive said third subsystem to produce a first receiver signal in synchronization with the first transmitter signal to drive said fourth subsystem;

said fourth subsystem being responsive to the first receiver signal for producing a second receiver signal in synchronization with the second transmitter signal; and third means responsive to said second receiver signal for producing the receiver filter output signal, the receiver filter output signal corresponding to the undesired frequencies removed from the second transmitter signal.

7. The filtered cascaded synchronized nonlinear system of claim 6 wherein said first means comprises:

fourth means for filtering the second transmitter signal to produce a filter output signal; and fifth means responsive to the second transmitter signal and the filter output signal for producing the transmitter output signal.

8. The filtered cascaded synchronized nonlinear system of claim 6 wherein said first means comprises:

a communications channel for removing undesired frequencies from the second transmitter signal to produce and transmit the transmitter output signal to said second means.

9. The filtered cascaded synchronized nonlinear system of claim 6 wherein:

at least part of said first subsystem is external to said second subsystem, and at least part of said second subsystem is external to said first subsystem.

10. The filtered cascaded synchronized nonlinear system of claim 7 wherein:

said fifth means is a subtractor for subtracting the filter output signal from the second transmitter signal to produce the transmitter output signal;

said second means is an adder for summing the receiver filter output signal with the transmitter output signal to produce the first receiver drive signal; and each of said third and fourth means is a filter.

* * * * *